US011477703B2

(12) United States Patent
Xu et al.

(10) Patent No.: US 11,477,703 B2
(45) Date of Patent: *Oct. 18, 2022

(54) METHOD FOR ESTABLISHING A FRONTHAUL INTERFACE, METHOD FOR PERFORMING ACCESS FOR A UE, METHOD AND APPARATUS FOR PERFORMING A HANDOVER FOR A UE, DATA FORWARDING METHOD, USER EQUIPMENT AND BASE STATION

(71) Applicant: Samsung Electronics Co., Ltd., Gyeonggi-do (KR)

(72) Inventors: Lixiang Xu, Beijing (CN); Weiwei Wang, Beijing (CN); Xiaowan Ke, Beijing (CN); Hong Wang, Beijing (CN); Shichang Zhang, Beijing (CN); Yingyang Li, Beijing (CN); Yi Wang, Beijing (CN); Xiaoning Ma, Beijing (CN)

(73) Assignee: Samsung Electronics Co., Ltd.

( * ) Notice: Subject to any disclaimer, the term of this patent is extended or adjusted under 35 U.S.C. 154(b) by 56 days.

This patent is subject to a terminal disclaimer.

(21) Appl. No.: 17/128,921

(22) Filed: Dec. 21, 2020

(65) Prior Publication Data

US 2021/0112463 A1    Apr. 15, 2021

Related U.S. Application Data

(63) Continuation of application No. 16/318,244, filed as application No. PCT/KR2018/005290 on May 8, 2018, now Pat. No. 10,880,789.

(30) Foreign Application Priority Data

May 5, 2017    (CN) .......................... 201710313812.5
Jun. 16, 2017   (CN) .......................... 201710458428.4
Jan. 5, 2018    (CN) .......................... 201810010479.5

(51) Int. Cl.
*H04W 88/08*    (2009.01)
*H04W 24/02*    (2009.01)
(Continued)

(52) U.S. Cl.
CPC ......... *H04W 36/0033* (2013.01); *H04L 67/12* (2013.01); *H04W 8/22* (2013.01);
(Continued)

(58) Field of Classification Search
CPC ..... H04W 76/12; H04W 36/30; H04W 76/19; H04W 12/06; H04W 12/03; H04W 48/12; H04B 7/18528
See application file for complete search history.

(56) References Cited

U.S. PATENT DOCUMENTS

2016/0337010 A1   11/2016   Park et al.
2018/0034515 A1*   2/2018   Guo .................... H04B 7/0404
(Continued)

FOREIGN PATENT DOCUMENTS

CN      106102106      11/2016
CN      106162730      11/2016
(Continued)

OTHER PUBLICATIONS

Catt, "Considerations on RAN Function Split between CU and DU", R3-162863, 3GPP TSG RAN WG3 Meeting #94, Nov. 14-18, 2016, 5 pages.
(Continued)

*Primary Examiner* — Iqbal Zaidi
(74) *Attorney, Agent, or Firm* — The Farrell Law Firm, P.C.

(57) ABSTRACT

The present disclosure relates to a communication method and system for converging a 5th-Generation (5G) commu-
(Continued)

nication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method for performing access for a UE. In addition, the present disclosure discloses a data forwarding method and a data forwarding equipment, user equipment and base station. By the technical solutions disclosed in the present disclosure, a UE may help a base station to forward data of other UEs.

28 Claims, 24 Drawing Sheets

(51) Int. Cl.
| | | |
|---|---|---|
| H04W 8/24 | (2009.01) | |
| H04W 76/34 | (2018.01) | |
| H04W 36/02 | (2009.01) | |
| H04W 8/26 | (2009.01) | |
| H04W 48/12 | (2009.01) | |
| H04W 84/04 | (2009.01) | |
| H04W 36/08 | (2009.01) | |
| H04W 76/22 | (2018.01) | |
| H04W 88/02 | (2009.01) | |
| H04L 67/12 | (2022.01) | |
| H04W 36/30 | (2009.01) | |
| H04W 76/11 | (2018.01) | |
| H04W 76/27 | (2018.01) | |
| H04W 8/22 | (2009.01) | |
| H04W 36/00 | (2009.01) | |
| H04W 72/04 | (2009.01) | |
| H04W 80/02 | (2009.01) | |
| H04W 80/08 | (2009.01) | |
| H04W 88/04 | (2009.01) | |

(52) U.S. Cl.
CPC .......... *H04W 36/08* (2013.01); *H04W 36/30* (2013.01); *H04W 72/0453* (2013.01); *H04W 76/11* (2018.02); *H04W 76/22* (2018.02); *H04W 76/27* (2018.02); *H04W 80/02* (2013.01); *H04W 80/08* (2013.01); *H04W 88/02* (2013.01); *H04W 8/24* (2013.01); *H04W 8/26* (2013.01); *H04W 24/02* (2013.01); *H04W 36/0055* (2013.01); *H04W 36/0085* (2018.08); *H04W 36/023* (2013.01); *H04W 48/12* (2013.01); *H04W 76/34* (2018.02); *H04W 84/042* (2013.01); *H04W 88/04* (2013.01); *H04W 88/085* (2013.01)

(56) References Cited

U.S. PATENT DOCUMENTS

| | | |
|---|---|---|
| 2018/0213579 A1 | 7/2018 | Hong et al. |
| 2018/0270792 A1 | 9/2018 | Park |
| 2019/0222291 A1 | 7/2019 | Wang et al. |
| 2019/0223251 A1 | 7/2019 | Jiang et al. |
| 2019/0297654 A1 | 9/2019 | Chen |
| 2020/0045591 A1 | 2/2020 | Yokoyama |

FOREIGN PATENT DOCUMENTS

| | | |
|---|---|---|
| CN | 106538037 | 3/2017 |
| CN | 106550490 | 3/2017 |
| WO | WO 2017010693 | 1/2017 |
| WO | WO 2018/030819 | 2/2018 |

OTHER PUBLICATIONS

Catt, "Scenarios and Principles for Intra-gNB Mobility", R3-170992, 3GPP TSG RAN WG3 Meeting #95bis, Apr. 3-7, 2017, 2 pages.
Catt, "Intra-RAT Mobility in NR", R2-163473, 3GPP TSG RAN WG2 Meeting #94, May 23-27, 2016, 4 pages.
Zte et al., "Discussion on Fast Centralized Retransmission of Lost RLC PDUs during Inter-DU Handover", R3-171022, 3GPP TSG RAN WG3 Meeting #95-Bis, Apr. 3-7, 2017, 7 pages.
Samsung et al., "Intra-CU/Inter-DU Handover Support", R3-171697, 3GPP TSG-RAN WG3 Meeting #96, May 15-19, 2017, 2 pages.
European Search Report dated Feb. 11, 2021 issued in counterpart application No. 20206531.4-1212, 15 pages.
PCT/ISA/210 Search Report issued on PCT/KR2017/005416 (pp. 4).
PCT/ISA/237 Written Opinion issued on PCT/KR2017/005416 (pp. 6).
NTT Docomo, Inc., TSG-RAN Working Group 3 meeting #95, R3-170618, Athens, Greece, Feb. 13 to 17, 2017, CU-DU interface: Overall categorization of C-plane and U-plane, pp. 11.
LG Electronics Inc., R3-170405, 3GPP TSG-RAN WG3 Meeting #95, Athens, Greece, Feb. 13, 2017-Feb. 17, 2017, Transmission of RRC message via CU-DU interface, pp. 6.
ZTE, R3-171019, 3GPP TSG RAN WG3 Meeting #95bis, Spokane, USA, Apr. 3-7, 2017, Discussion on CU-DU interface control plane functions, pp. 5.
Ericsson, R3-171163, 3GPP TSG-RAN WG3 #95bis, Spokane, USA, Apr. 3-7, 2017, CU-DU interface functions, pp. 5.
Huawei, "F1AP Procedures for RRC Connection Setup", R3-171846, 3GPP TSG-RAN3 Meeting #96, May 15-19, 2017, 3 pages.
3GPP, 3rd Generation Partnership Project; Technical Specification Group Radio Access Network; NG-RAN; F1 Application Protocol (F1AP), (Release 15), 3GPP TS 38.473 V0.1.0, Jun. 2, 2017, 19 pages.
Samsung, KT, SK Telecom, "F1 Interface Setup and the Delivery of gNB-DU Capability", R3-171703, 3GPP TSG-RAN WG3 Meeting #96, May 15-19, 2017, 4 pages.
Catt, "Consideration on the Protocol Stack and Functions of CU/DU Interface", R3-170077, 3GPP TSG RAN WG3 Meeting #Adhoc, Jan. 17-19, 2017, 3 pages.
Samsung, KT, "Initial Access Procedure Consiering CU-DU Split", R3-174606, 3GPP TSG-RAN WG3 Meeting #98, Nov. 27-Dec. 1, 2017, 7 pages.
European Search Report dated Mar. 15, 2019 issued in counterpart application No. 18793976.4-1214, 17 pages.
3rd Generation Partnership Project; Technical Specification Group Radio Access Network; NG-RAN; F1 Application Protocol (F1AP) (Release 15), 3GPP TS 38.473, v33.34.35, May 2, 2017, 12 pages.
3rd Generation Partnership Project; Technical Specification Group Radio Access Network; Study on New Radio Access Technology; Radio Access Architecture and Interfaces (Release 14), 3GPP TR 38.801, V1.1.0, Jan. 2017, 83 pages.
Altiostar Networks, "On CD-DU Interface Specification", R3-170592, 3GPP TSG RAN WG3 Meeting #95, Feb. 13-17, 2017, 3 pages.
Huawei, "Analysis of the Latency between CU and DU on Common RRC Procedures", R3-171227, 3GPP TSG RAN WG3 #95bis, Apr. 3-7, 2017, 3 pages.
Korean Office Action dated Feb. 27, 2020 issued in counterpart application No. 10-2018-7037456, 14 pages.
Huawei, "F1 Application Protocol—38.4x3", R3-171364, 3GPP TSG-RAN WG3 Meeting #95-bis, Apr. 3-7, 2017, 8 pages.
Huawei, "Considerations on the Control Plane Functions located in DU", R3-171220, 3GPP TSG-RAN3 Meeting#95bis, Apr. 3-7, 2017, 3 pages.

(56) References Cited

OTHER PUBLICATIONS

Samsung, "Mobility in NR Connected-Active", R2-167521, 3GPP TSG-RAN WG2 Meeting #96, Nov. 14-18, 2016, 3 pages.
LG Electronics Inc., "Issue on Retransmission for Lost RLC PDUs", R3-170982, 3GPP TSG-RAN WG3 Meeting #95bis, Apr. 3-7, 20217, 3 pages.
Zte, "TP for UE Radio Bearer Management", R3-171598, 3GPP TSG RAN WG3 Meeting #96, May 15-19, 2017, 12 pages.
3GPP, 3rd Generation Partnership Project; Technical Specification Group Services and System Aspects; Study on the Security Aspects of the Next Generation System (Release 14) 3GPP TR 33.899 V1.1.0, Mar. 2017, 491 pages.
Chinese Office Action dated Jun. 10, 2021 issued in counterpart application No. 201710458428.4, 11 pages.
Korean Office Action dated Aug. 30, 2021 issued in counterpart application No. 10-2021-7014014, 11 pages.
Samsung, KT, SK Telecom, "Interface between gNB-CU/gNB-DU and O&M", R3-171635, 3GPP TSG-RAN WG3 Meeting #96, May 15-19, 2017, 2 pages.
Samsung, KT, "F1AP Function Definition and Categorization", R3-172246, 3GPP TSG-RAN WG3 Meeting Ad Hoc, Jun. 27-29, 2017, 4 pages.
3GPP, 3rd Generation Partnership Project; Technical Specification Group Radio Access Network; NG-RAN; F1 Application Protocol (F1AP) (Release 15), 3GPP TS 38.473 V15.1.1, Apr. 2018, 162 pages.
Chinese Office Action dated Sep. 7, 2021 issued in counterpart application No. 202110425791.2, 8 pages.
European Search Report dated Nov. 17, 2021 issued in counterpart application No. 21190384.4-1212, 15 pages.

\* cited by examiner

METHOD FOR ESTABLISHING A FRONTHAUL INTERFACE, METHOD FOR PERFORMING ACCESS FOR A UE, METHOD AND APPARATUS FOR PERFORMING A HANDOVER FOR A UE, DATA FORWARDING METHOD, USER EQUIPMENT AND BASE STATION

PRIORITY

This application is a Continuation Application of U.S. patent application Ser. No. 16/318,244, filed in the U.S. Patent and Trademark Office on Jan. 16, 2019 as a National Phase Entry of PCT International Application No. PCT/KR2018/005290 which was filed on May 8, 2018, and claims priority to Chinese Patent Application Nos. 201710313812.5, 201710458428.4, and 201810010479.5, which were filed on May 5, 2017, Jun. 16, 2017, and Jan. 5, 2018, respectively, the content of each of which is incorporated herein by reference.

BACKGROUND

1. Field

The present disclosure relates to radio communications, and particularly to a method for establishing a fronthaul interface, a method for performing access for a UE, a method and apparatus for performing a handover for a user equipment (UE), a method for data forwarding in a 5G communication network, a user equipment and a base station.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Modern mobile communications more and more tend to provide services having higher mobile bandwidths, less latency, and supporting a large number of user equipment. In a $5^{th}$ generation (5G) network or communication system, different network elements fall into different categories: User Equipments (UEs), access nodes (gNB), core network (CN) functional entities, or more, according to their tasks.

FIG. 1 shows a schematic diagram of system architecture in a next generation of network or a 5G network or communication system.

In the system architecture, a UE 101 is a terminal device used to receive data.

A next generation of radio access network (NG-RAN) 102 is a radio access network, including a base station (a gNB or an eNB that is connected to a 5G core network (5GC)) for providing an interface for the UE to access a radio network.

An access and mobility management function (AMF) 103 is responsible for managing UE mobility context and security information.

A user plane function (UPF) 104 is configured to provide functions of a user plane.

A session management function (SMF) 105 is responsible for session management.

A data network (DN) 106 includes an operator's services, access to the Internet, services of the third party, and so on.

To support virtualizing network functions and achieve more efficient resource management and scheduling, a gNB in the 5G may be further divided into a central unit (gNB-CU) and a distributed unit (gNB-DU) which are abbreviated as CU and DU in the following. The packet data convergence protocol (PDCP) and radio resource control (RRC) functions are on the CU. The radio link control (RLC), media access control (MAC) and physical layer functions are on the DU. Between the CU and the DU, there is a standard open interface F1. The F1 interface may be divided into a control plane (F1-C) and a user plane (F1-U). The transport network layer of the F1-C is based on IP transmission. To transmit signaling more reliably, a stream control transmission protocol (SCTP) protocol is added above the IP. The application layer protocol of the F1 interface is F1AP. The SCTP may provide reliable transmission for application layer messages. On the transport layer of the F1-U, is user datagram protocol/internet protocol (UDP/IP), and a general packet radio service (GPRS) tunneling protocol user plane (GTP-U) is above the UDP/IP, and used to carry protocol data units (PDUs) on the user plane.

As can be seen from the traditional art that, the architecture of 5G is different from that of long term evolution (LTE), and a base station of 5G should support a fronthaul interface. However, there is not yet a detailed solution regarding how to support UE access, call setup, and handover over an F1 interface.

FIG. 2 is a schematic diagram of another system architecture in a 5G network or communication system.

A UE is connected to a gNB via an air interface (Uu interface) to transmit and receive data in a Control Plane (CP) and a User Plane (UP).

In a practical scenario, different UEs connected to a same gNB may have different radio channel conditions. Some UEs may have a great channel condition; and some UEs may have a poor channel condition, the QoS of those UEs may be influenced significantly so that the user experience will be deteriorated seriously. There is another scenario where, when congestion occurs in a cell, the normal operation of users may not be satisfied if all users perform communication with a base station. Therefore, some UEs are required to help the base station to forward data of other UEs.

SUMMARY OF THE INVENTION

The present invention has been made to address at least the above mentioned problems and/or disadvantages and to provide at least the advantages described below.

The present disclosure provides several methods for establishing a fronthaul interface, methods for performing access for a UE, methods and apparatus for performing a handover and communications for a UE, so as to achieve better intercommunications between a DU and a CU.

In an embodiment, the present disclosure provides a method performed by a central unit (CU) of a base station, the method comprising: receiving, from a distributed unit (DU) of the base station, a first message for setting up an F1 interface, the first message including an identity on the DU and serving cell information on the DU; storing data included in the first message; and transmitting, to the DU of the base station, a second message based on the first message, the second message including information on at least one cell in the DU, wherein the serving cell information includes a global cell identity, a physical cell identity, a public land mobile network (PLMN) identity, cell frequency information and cell bandwidth information, and wherein the information on the at least one cell includes the global cell identity.

In an embodiment, the present disclosure provides a method performed by a distributed unit (DU) of a base station, the method comprising transmitting, to a central unit (CU) of the base station, a first message for setting up an F1 interface, the first message including an identity on the DU and serving cell information on the DU; receiving, from the CU of the base station, a second message based on the first message, the second message including information on at least one cell in the DU, wherein the serving cell information includes a global cell identity, a physical cell identity, a public land mobile network (PLMN) identity, cell frequency information and cell bandwidth information, and wherein the information on the at least one cell includes the global cell identity.

In an embodiment, the present disclosure provides a central unit (CU) of a base station comprising: a transceiver and a controller coupled with the transceiver and configured to: receive, from a distributed unit (DU) of the base station, a first message for setting up an F1 interface, the first message including an identity on the DU and serving cell information on the DU, store data included in the first message, and transmit, to the DU of the base station, a second message based on the first message, the second message including information on at least one cell in the DU, wherein the serving cell information includes a global cell identity, a physical cell identity, a public land mobile network (PLMN) identity, cell frequency information and cell bandwidth information, and wherein the information on the at least one cell includes the global cell identity.

In an embodiment, the present disclosure provides a distributed unit (DU) of a base station comprising: a transceiver and a controller coupled with the transceiver and configured to: transmit, to a central unit (CU) of the base station, a first message for setting up an F1 interface, the first message including an identity on the DU and serving cell information on the DU, receive, from the CU of the base station, a second message based on the first message, the second message including information on at least one cell in the DU, wherein the serving cell information includes a global cell identity, a physical cell identity, a public land mobile network (PLMN) identity, cell frequency information and cell bandwidth information, and wherein the information on the at least one cell includes the global cell identity.

In the data forwarding method disclosed in the present disclosure, a UE enters an enhanced mode according to an indication from a base station, and then the UE forwards data between the base station and other UEs, thus achieving forwarding of data of other UEs by the UE. When other UEs have a poor channel condition or when congestion occurs in a cell of a base station, it may be well solved by the method of the present disclosure. Therefore, the user experience is improved.

BRIEF DESCRIPTION OF THE DRAWINGS

The above and other objects, features and advantages of the present invention will be more apparent from the following detailed description in conjunction with the accompanying drawings, in which:

FIG. 1 is a schematic diagram of the system architecture in a 5G communication system;

DETAILED DESCRIPTION OF EMBODIMENTS OF THE PRESENT DISCLOSURE

Hereinafter, embodiments of the present invention are described in detail with reference to the accompanying drawings. Those of ordinary skill in the art will recognize that various changes and modifications of the embodiments described herein can be made without departing from the scope of the present invention. In addition, descriptions of well-known functions and constructions may be omitted for clarity and conciseness. The same reference symbols are used throughout the drawings to refer to the same or like parts.

To make the objects, technical schemes and advantages of the present disclosure clearer, the present disclosure will be described in detail hereinafter with reference to accompanying drawings and embodiments.

The present disclosure provides three methods for establishing a fronthaul interface between a DU and a CU, and meanwhile provides methods for performing access for a UE and methods for performing a handover for a UE after establishing a fronthaul interface. The respective methods will be described in detail in the following.

Embodiment 1

Figure 1:
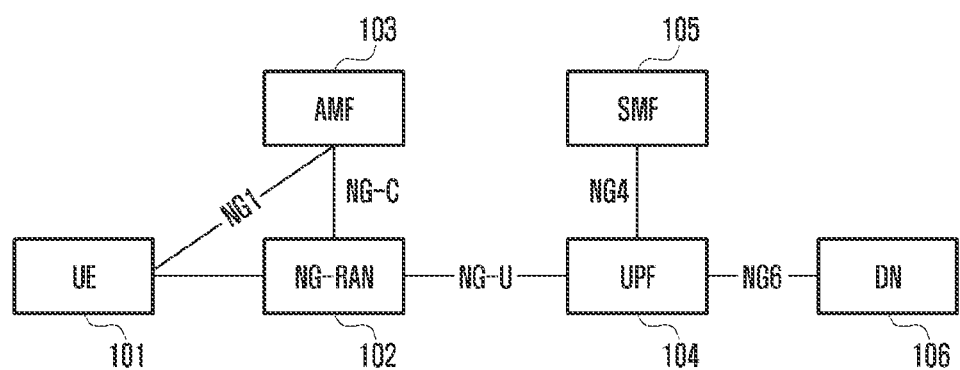
FIG. 1 is a schematic diagram of system architecture in a 5G network or communication system.
Figure 2:
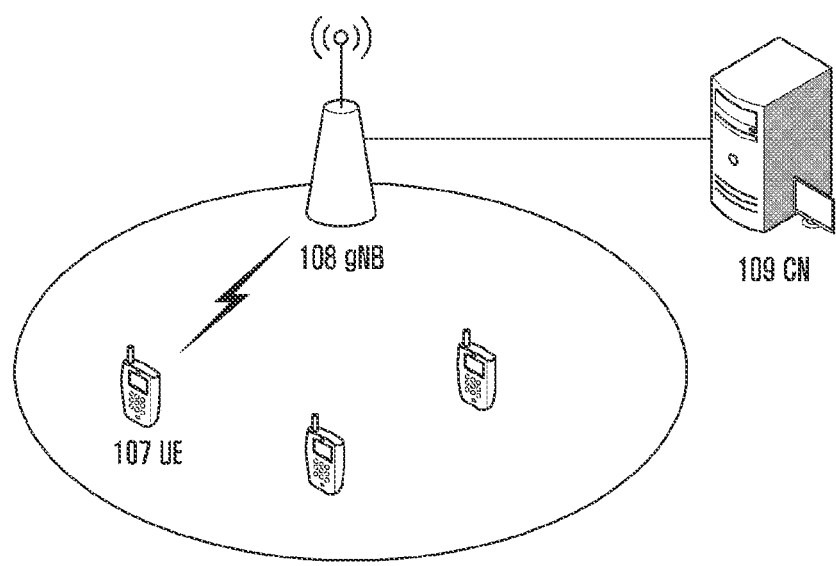
FIG. 2 is a schematic diagram of another system architecture in a 5G network or communication system.
Figure 3:
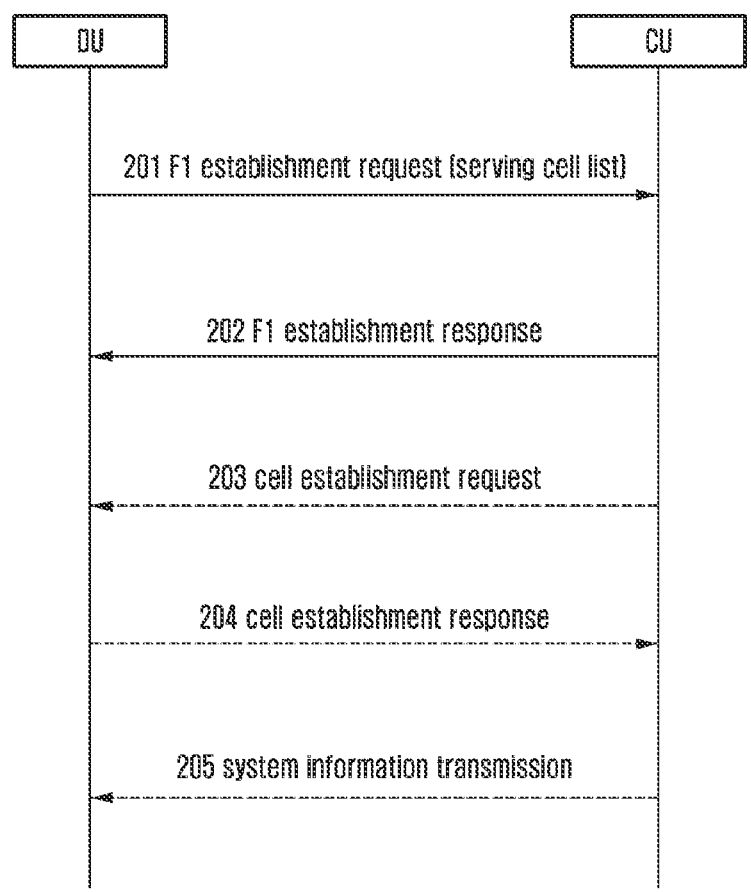
FIG. 3 is a schematic diagram of a first method of establishing a fronthaul interface according to the present disclosure.

A first method for establishing a fronthaul interface according to the present disclosure is as shown in FIG. 3. In the method, it is a DU that initiates an F1 interface establishment procedure. The method may be applicable to a situation where an O&M has an interface with a CU and with the DU, or where the O&M only has an interface with the DU. The method for establishing a fronthaul interface includes processing at the DU side and at the CU side, and for description purpose, the establishing method is described through interactions between the DU and the CU, and the establishing method includes the following steps:

Step 201, a DU sends an F1 establishment request message to a CU.

An operation and maintenance system (O&M) configures a transport layer address of the CU to be connected by the DU to the DU. The O&M also configures application layer information of the DU to the DU.

The F1 establishment request message may include one or more pieces of the following information:

DU identity.

Serving cell information list on the DU. The serving cell information includes: a cell identity, cell frequency information, uplink transmission bandwidth information, downlink transmission bandwidth information, a physical cell identity, a tracking area identity (TAI) or a tracking area code (TAC), a list of broadcast public land mobile network (PLMN) identities, transmission reception point (TRP) information, beam information, information of a physical channel in the cell, information of a transport channel in the cell, information of a logic channel in the cell and/or a cell access layer protocol (AP) identity used for the F1 interface and allocated by the DU. The cell identity may be a global cell identity or a cell identity unique on the DU, or other cell identities received from the O&M. The cell AP identity allocated by the DU is configured to establish a cell signaling connection for the F1 interface, used to transmit information related to the cell. The serving cell information also includes clock information, e.g., a system frame number (SFN).

DU capability information. The DU capability information includes DU buffer capability, DU capacity information, antenna capability, power capability, and/or DU fronthaul interface capability.

Step 202, the CU receives an F1 establishment request message. The CU stores the received information, and sends an F1 establishment response message to the DU.

If the CU receives the DU capability information, the CU uses the DU capability information to schedule the UE, e.g., deciding a DU for serving the UE, or deciding load balance between different DUs.

The F1 establishment response message may include one or more pieces of the following information:

CU identity. The CU identity may be an identity of a gNB or may be a separate CU identity.

List of PLMN identities supported by the CU.

Cell configuration list. Configuration information of a cell in the cell configuration list includes: a cell identity, configuration information of a common channel in the cell, system information in the cell, scheduling information for sending the system information and/or a cell AP identity for an F1 interface allocated by the CU. The cell identity may be a global cell identity or a cell identity unique on the DU or a cell identity unique on the CU. The configuration information of the common channel includes configuration information of a physical channel, configuration information of a transport channel, and configuration information of a logic channel. The system information includes master information blocks (MIBs) and system information blocks. The CU decides the scheduling information of the system information according to clock information of the cell received from the DU. The CU includes the clock information of the cell (e.g., an SFN) received from the DU in the system information. The cell AP identity allocated by the CU is used to establish a cell signaling connection for the F1 interface, used to transmit information related to the cell. Herein, if the F1 establishment response message includes the cell configuration list, then it means that the establishment of the cell is completed through the F1 establishment procedure.

As described in the foregoing, if the F1 establishment response message includes the cell configuration list, it means that the cell in the DU is configured through the F1 establishment procedure, and the cell configuration list includes the system information in the cell and the scheduling information for sending the system information, which equals to sending the system information that needs to be broadcasted in the cell to the DU, so that the DU can work rapidly. As another method of the present disclosure, the cell establishment procedure may be an independent procedure, and in this case, the F1 establishment response message does not contain the cell configuration list. Corresponding to this method, the following steps are further included:

Step 203, the CU sends a cell establishment request message to the DU.

The cell establishment request message contains information of a cell to be configured. The information of the cell to be configured may be the same with the cell configuration information in the step 202, which will not be elaborated herein.

Step 204, the DU sends a cell establishment response message to the CU.

The cell establishment procedure may be used to configure one cell or multiple cells. In case of configuring one cell, the messages in the step 203 and the step 204 are sent through the cell signaling connection, i.e., the cell establishment request message and the cell establishment response message containing a cell AP identity allocated by the DU and a cell AP identity allocated by the CU, and in this case, the cell establishment request message and the cell establishment response message may not need to contain the cell identity.

In this method, through the cell establishment procedure, the system information needs to be broadcasted in the cell is sent to the DU, so that the DU can send system information as soon as possible after the cell is configured successfully. As another method of the present disclosure, the system information may be sent through an independent procedure. Corresponding to this method, the present method further includes the following step:

Step 205, the CU sends a system information transfer message to the DU.

The system information transfer message includes a cell identity, system information in the cell, and scheduling information for sending the system information. The CU determines the scheduling information of the system information according to the clock information of the cell received from the DU. The CU includes the clock information of the cell, e.g., an SFN, received from the DU in the system information.

The system information transfer procedure may be used to transmit system information of one or more cells. If system information of one cell is transmitted, the message in the step 205 is transmitted through the cell signaling connection, i.e., the system information transfer message contains a cell AP identity allocated by the DU and a cell AP identity allocated by the CU, and in this case, the system information transfer message may not need to contain the cell identity.

Till then, the description of the first method for establishing an F1 interface according to the present disclosure is completed. Through the method, not only application layer information of the DU and the CU can be exchanged, so as to reduce the configuration cost of the operator, but also the common resources of the DU and the CU can be rapidly configured after the DU is started up, which makes preparation for the access of the UE, and can achieve the object of fast start-up.

Embodiment 2

Figure 4:
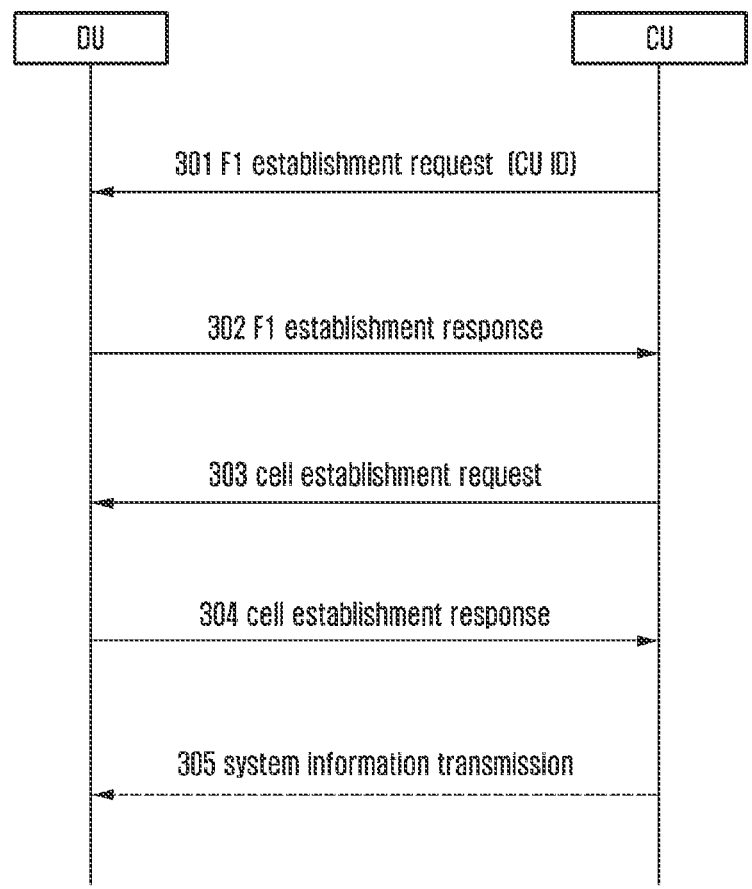
FIG. 4 is a schematic diagram of a second method of establishing a fronthaul interface according to the present disclosure.

A second method for establishing a fronthaul interface according to the present disclosure is as shown in FIG. 4. In the method, it is a CU that initiates an F1 interface establishment procedure. The method may be applicable to a situation where an O&M has an interface with the CU and with a DU, or where the O&M only has an interface with the CU. The method for establishing a fronthaul interface includes processing at the DU side and at the CU side, and for description purpose, the establishing method is described through interactions between the DU and the CU, and the establishing method includes the following steps:

Step 301, a CU sends an F1 establishment request message to a DU.

An O&M configures a transport layer address of the DU to be connected by the CU to the CU. The O&M configures the application layer information on the CU to the CU. If the O&M only has an interface with the CU, then the O&M also configures application layer information of each DU to be connected by the CU to the CU.

The F1 establishment request message may include one or more pieces of the following information:

CU identity. The CU identity may be an identity of a gNB or may be a separate CU identity.
  List of PLMN identities supported by the CU.
  Serving cell information list on the DU. The serving cell information includes: a cell identity, cell frequency information, uplink transfer bandwidth information, downlink transfer bandwidth information, a physical cell identity, a TAI or a TAC, a list of broadcasted PLMN identities, TRP information, beam information, information of a physical channel in the cell, information of a transport channel in the cell, information of a logic channel in the cell and/or a cell access layer AP identity used for the F1 interface allocated by the DU. The cell identity may be a global cell identity or a cell identity unique on the DU, or other cell identities received from the O&M. The cell AP identity allocated by the DU is configured to establish a cell signaling connection for the F1 interface, used to transmit information related to the cell. The serving cell information also includes clock information, e.g., an SFN. It is to be specified that, when the O&M only has an interface with the CU, the clock information is needed, and the O&M configures the configuration information of the DU to the CU, and sends the configuration information of the DU to a corresponding DU through the CU.
  Cell configuration list. Configuration information of a cell in the cell configuration list includes: a cell identity, configuration information of a common channel in the cell, system information in the cell, scheduling information for sending the system information and/or a cell AP identity for an F1 interface allocated by the CU. The cell identity may be a global cell identity or a cell identity unique on the DU or a cell identity unique on the CU. The configuration information of the common channel includes configuration information of a physical channel, configuration information of a transport channel, and configuration information of a logic channel. The system information includes master information blocks (MIBs) and system information blocks. The CU decides the scheduling information of the system information according to clock information of the DU cell. The CU includes the clock information (e.g., an SFN) of the DU cell in the system information. The cell AP identity allocated by the CU is used to establish a cell signaling connection for the F1 interface, used to transmit information related to the transfer cell. Herein, if the F1 establishment request message includes the cell configuration list, then it means that the establishment of the cell is completed during the F1 establishment procedure.

Step 302, the DU receives an F1 establishment request message. The DU stores the F1 establishment request message received. If the DU receives cell configuration information, the DU configures a corresponding cell. The DU sends an F1 establishment response message to the CU.

The F1 establishment response message may contain one or more of the following information:
  DU identity.
  DU capability information. The DU capability information includes DU cache capability, DU capacity information, antenna capability, power information and/or fronthaul interface capability.
  Cell configuration information. The cell configuration information is actually configuration information configured by the DU for the cell, which may be different from the F1 establishment request message in case of receiving by the CU.

The CU stores the information received. If the CU receives the DU capability information, the CU uses the DU capability information to schedule the UE, for example, deciding a UE for serving the UE, or deciding load balance between different UEs. The CU sends an F1 establishment response message to the DU.

As described in the foregoing, if the F1 establishment request message includes the cell configuration list, then it means that the cell needed by the DU has been configured successfully through the F1 establishment procedure, and the cell configuration list includes the system information in the cell and the scheduling information for sending the system information, which equals to sending the system information that needs to be broadcasted in the cell to the DU, so that the DU can work rapidly. As another method of the present disclosure, the cell establishment procedure may be an independent procedure, and in this case, the F1 establishment request message does not contain the cell configuration list. Corresponding to this method, the following steps are further included:

Step 303, the CU sends a cell establishment request message to the DU.

The cell establishment request message contains information of a cell to be configured. The information of the cell to be configured is the same with the cell configuration information in the step 301, and will not be elaborated herein.

Step 304, the DU sends a cell establishment response message to the CU.

In the method, through the cell establishment procedure, the system information needs to be broadcasted in the cell is sent to the DU, so that the DU can send system information as soon as possible after the cell is configured successfully.

As another method of the present disclosure, the system information may be sent through an independent procedure. Corresponding to this method, the present method further includes the following steps:

Step 305, the CU sends a system information transfer message to the DU.

The system information transfer message includes a cell identity, system information in the cell, and scheduling information for sending the system information. The CU determines the scheduling information of the system information according to the clock information of the DU cell. The CU includes the clock information of the DU cell, e.g., an SFN, in the system information.

The cell establishment procedure may be used to configure one cell or multiple cells. If it is used to configure one cell, the messages in the step 303 and the step 304 are sent through the cell signaling connection, i.e., the system information transfer message containing a cell AP identity allocated by the DU and a cell AP identity allocated by the CU, and in this case, the system information transfer message may not need to contain the cell identity.

The system information transfer procedure may be used to send system information of one or more cells. If system information of one cell is sent, the message in the step 305 is transmitted through the cell signaling connection, i.e., the system information transfer message containing the cell AP identity allocated by the DU and the cell AP identity allocated by the CU, and in this case, the system information transfer message may not need to contain the cell identity.

Till then, the description of the second method for establishing an F1 interface according to the present disclosure is completed. Through the method, not only application layer information of the DU and the CU can be exchanged, so as to reduce the configuration cost of the operator, and can work when the O&M only has an interface with the CU, but also the public resources of the DU and the CU can be rapidly configured after the DU is started up, which makes preparation for the access of the UE, and can achieve the object of fast start-up.

Embodiment 3

Figure 5:
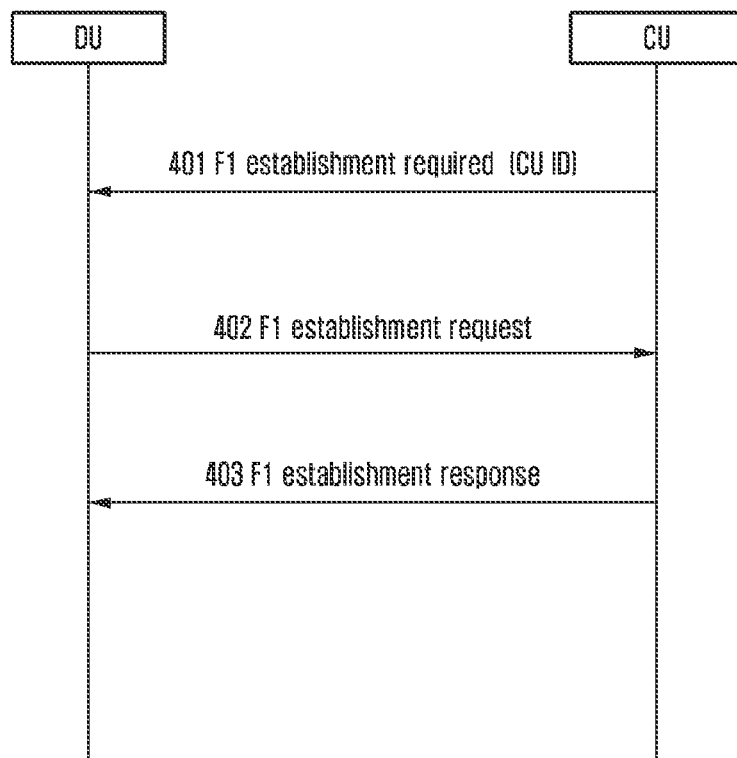
FIG. 5 is a schematic diagram of a third method of establishing a fronthaul interface according to the present disclosure.

A third method for establishing a fronthaul interface according to the present disclosure is as shown in FIG. 5. In the method, it is a CU that triggers an F1 interface establishment procedure. The method may be applicable to a situation where an O&M has an interface with the CU and with a DU, or where the O&M only has an interface with the CU. The method for establishing a fronthaul interface includes processing at the DU side and at the CU side, and for description purpose, the establishing method is described through interactions between the DU and the CU, and the establishing method includes the following steps:

Step 401, the CU sends an F1 establishment required message to the DU.

An O&M configures a transport layer address of the DU to be connected by the CU to the CU. The O&M configures application layer information of the CU to the CU. If the O&M only has an interface with the CU, the O&M also configures application layer information of each DU to be connected by the CU to the CU.

The F1 establishment required message may include one or more pieces of the following information:
  CU identity. The CU identity may be a gNB identity or a separate CU identity.
  List of PLMN identities supported by the CU.

Serving cell information list on the DU. The serving cell information includes: a cell identity, cell frequency information, uplink transfer bandwidth information, downlink transfer bandwidth information, a physical cell identity, a TAI or a TAC, a list of broadcast PLMN identities, TRP information, beam information, information of a physical channel in the cell, information of a transport channel in the cell, information of a logic channel in the cell and/or a cell access layer AP identifier used for the F1 interface and allocated by the DU. The cell identifier may be a global cell identity or a cell identity unique on the DU or a unique cell identity received from the O&M. The cell AP identifier allocated by the DU is used to establish a cell signaling connection for the F1 interface, used to transmit information related to the cell. The serving cell information may also include clock information, such as a system frame number (SFN). It is to be specified that, when the O&M only has an interface with the CU, the clock information is contained, and the O&M configures the configuration information of the DU to the CU, and passes the configuration information of the DU to the corresponding DU through the CU.

Step 402, the DU sends an F1 establishment request message to the CU. The DU is configured with the application layer information on the DU through the O&M or the DU contains the application layer information on the DU through the CU.

The F1 establishment request message may include one or more pieces of the following information:

CU identity.

Serving cell information list on the DU. The serving cell information includes: a cell identity, cell frequency information, uplink transfer bandwidth information, downlink transfer bandwidth information, a physical cell identity, a TAI or a TAC, a list of broadcasted PLMN identities, TRP information, beam information, information of a physical channel in the cell, information of a transport channel in the cell, information of a logic channel in the cell and/or a cell access layer AP identity used for the F1 interface allocated by the DU. The cell identity may be a global cell identity or a cell identity unique on the DU, or other cell identities received from the O&M. The cell AP identity allocated by the DU is configured to establish a cell signaling connection for the F1 interface, used to transmit information related to the cell. The serving cell information also includes clock information, e.g., an SFN.

Corresponding to the DU obtaining the application layer information from the CU, that is to say, if the F1 establishment required message in the step 401 contains the serving cell information list on the DU, then in this step, the serving cell information list on the DU does not need to be contained.

DU capability information. The DU capability information includes DU buffer capability, DU capacity information, antenna capability, power information and/or DU fronthaul interface capability.

Step 403, the CU receives an F1 establishment request message. The CU stores the received information. If the CU receives the DU capability information, the CU uses the DU capability information to schedule the UE, e.g., deciding a DU for serving the UE or deciding load balance between different DUs. The CU sends an F1 establishment response message to the DU.

The F1 establishment response message may include one or more pieces of the following information:

List of PLMN identities supported by the CU.

Cell configuration list. Configuration information of a cell in the cell configuration list includes: a cell identity, configuration information of a common channel in the cell, system information in the cell, scheduling information for sending the system information and/or a cell AP identity for an F1 interface allocated by the CU. The cell identity may be a global cell identity or a cell identity unique on the DU or a cell identity unique on the CU. The configuration information of the common channel includes configuration information of a physical channel, configuration information of a transport channel, and configuration information of a logic channel. The system information includes master information blocks (MIBs) and system information blocks. The CU decides the scheduling information of the system information according to clock information of the DU cell. The CU includes the clock information of the DU cell (e.g., an SFN) in the system information. The cell AP identity allocated by the CU is used to establish a cell signaling connection for the F1 interface, used to transmit information related to the cell. Herein, if the F1 establishment response message includes the cell configuration list, then it means that the establishment of the cell is completed during the F1 establishment procedure.

As described in the foregoing, if the F1 establishment response message includes the cell configuration list, it means that the cell needed by the DU has been configured successfully through the F1 establishment procedure, and the cell configuration list includes the system information in the cell and the scheduling information for sending the system information, which equals to sending the system information that needs to be broadcasted in the cell to the DU, so that the DU can work rapidly. Or, as another method of the present disclosure, the cell establishment procedure may be an independent procedure, and in this case, the F1 establishment response message does not contain the cell configuration list. A detailed procedure is the same as that in steps 203 and 204, and will not be elaborated herein.

In this method, through the cell establishment procedure, the system information needs to be broadcasted in the cell is sent to the DU, so that the DU can send system information as soon as possible after the cell is configured successfully. As another method of the present disclosure, the system information may be sent through an independent procedure. Corresponding to this method, a detailed step is the same as the step 205, and will not be elaborated herein.

When the application layer information of the DU, e.g., the capability information or clock information of the DU, is updated, the DU sends a DU configuration updating message to the CU to notify the CU of the updated application layer information. The CU stores the received updated application layer information. Alternatively, the CU may sends a DU configuration updating response message to the DU. When the CU receives the updating information of the DU and determines to update the system information, the CU sends a system information updating message to the DU, the system information updating message includes updated system information and/or scheduling information of the system information. The CU may send the updated system information and/or the scheduling information of the system information to the DU through the DU configuration updating response message.

When the application layer information of the CU, e.g., the list of PLMN supported by the CU, is updated, the CU sends a CU configuration updating message to the DU to notify the DU of the updated application layer information. The DU stores the received updated application layer information. Alternatively, the DU may send a CU configuration updating response message to the CU.

Embodiment 4

Figure 6:
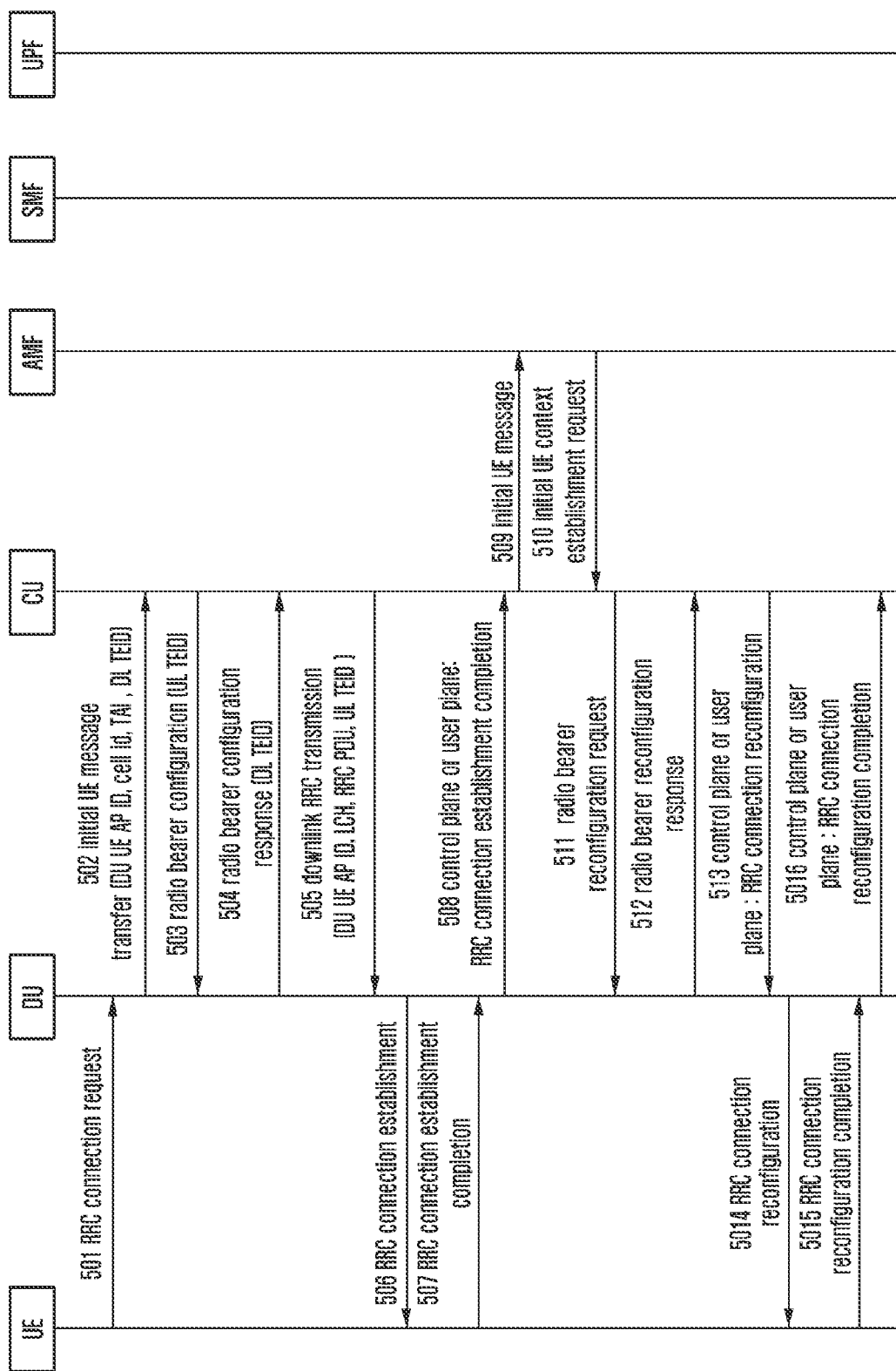
FIG. 6 is a schematic diagram of a method for performing access for a UE according to the present disclosure.

A method for performing access for a UE is as shown in FIG. 6, and the method may be used in a scenario of attach, packet data network (PDN) connection establishment, etc.

For the UE and the core network (including an AMF and a UPF), the access network entity is a gNB. If the gNB is further divided into CU and DU function entities, they are transparent to the UE and the core network. Therefore, when the communication procedures between the UE and the gNB is described, what described is RRC procedures between the UE and the gNB; and when the communication procedures between the gNB and the core network, what described is procedures between the gNB and the AMF or between the gNB and the UPF. If the gNB is divided into the CU and DU function entities, an entity at the gNB side that actually first receives an RRC message from the UE is the DU, and the DU sends the RRC message to the CU; and an entity at the gNB side that actually first receives an NG message from the AMF is the CU. For description purpose, the procedure between the UE and the gNB is described as a procedure between the UE and the DU, and the procedure between the gNB and the AMF or between the gNB and the UPF is described as a procedure between the CU and the AMF or between the CU and the UPF, similarly for other embodiments, which does not affect the main content of the present disclosure. The detailed description irrelevant to the present disclosure is omitted, e.g., the procedure between the AMF and the SMF and between the AMF and the UPF. The method shown in FIG. 6 includes the following steps:

Step 501, the UE sends an RRC connection request message to the base station.

Step 502, the DU receives the RRC connection request message from the UE. The DU receives the message from the UE on a common control channel (CCCH), and knows that the UE is in an idle mode or an inactive mode. The DU sends an initial UE message transfer message to the CU.

The initial UE message transfer message is an F1 application layer AP message. The F1 application layer AP message may include one or more information elements of the following:

DU UE AP ID allocated for the UE by the DU.
cell identity. The cell identity is to indicate a cell, from which the DU receives the message from the UE. The cell identity may be a global cell identity or a cell identity unique on the DU or a cell identity unique on the CU. If the cell identity is the cell identity unique on the DU, then the initial UE message transfer message also contains a DU identity.
TAI.
RRC message received from the UE.
C-RNTI allocated for the UE by the DU.

RRC messages between the DU and the CU may be transmitted through a control plane (i.e., through an F1 AP message), or an RRC message on a signaling radio bearer SRB0 may be transmitted through the control plane, and RRC messages on other SRBs are transmitted through the user plane, i.e., through a GPRS tunneling protocol of the user plane (GTP-U).

Corresponding to the approach, in which the RRC message on the SRB0 is transmitted through the control plane, and the RRC messages on the other SRBs are transmitted through the user plane, the RRC messages on the other SRBs are transmitted through a same user plane tunnel, or for each SRB, a user plane tunnel is established, and the RRC messages on the other SRBs are transmitted through user plane tunnels separately. Corresponding to the latter method, the allocated channel information in the following corresponds to each SRB. The present embodiment provides three approaches to establish a user plane tunnel for transmitting RRC messages between the DU and the CU.

Approach 1: in step 502, the DU allocates downlink tunnel information, and sends the allocated downlink tunnel information to the CU through an initial UE message transfer message. In step 503, the CU allocates uplink tunnel information, and sends the allocated uplink tunnel information to the DU through a radio bearer configuration message. The downlink tunnel information and the uplink tunnel information includes a TEID and/or a transport layer address.

Approach 2: in step 502, the DU allocates the downlink tunnel information, and sends the allocated downlink tunnel information to the CU through the initial UE message transfer message. In step 505, the CU allocates the uplink tunnel information, and sends the allocated uplink tunnel information to the DU through a downlink RRC transfer message. The downlink tunnel information and the uplink tunnel information includes the TEID and/or the transport layer address.

Approach 3: in step 503, the CU allocates uplink tunnel information, and sends the allocated uplink tunnel information to the DU through a radio bearer configuration message. In step 504, the DU allocates downlink tunnel information, and sends the allocated downlink tunnel information to the CU through a radio bearer configuration response message. The downlink tunnel information and the uplink tunnel information includes the TED and/or the transport layer address.

Step 503, the CU receives the initial UE message transfer message from the DU, and according to the RRC message contained in the initial UE message transfer message, the CU knows that the RRC message is an RRC connection request message. The CU allocates a CU UE AP ID on the F1 interface for the UE. The CU sends a radio bearer configuration message to the DU, to request the DU to establish UE context and configure a radio bearer for the UE, and the radio bearer is a configuration of the SRB. The radio bearer configuration message may include one or more of the following information elements:

CU UE AP ID allocated for the UE by the CU.
DU UE AP ID allocated for the UE by the DU.
cell identity of a cell where the UE is located. The cell identity is a global cell identity or a cell identifier unique on the DU or a cell identifier unique on the CU.
Information of an RB to be configured. The RB contained in the radio bearer configuration message may be an SRB and/or a DRB. In this step, the RB to be configured is an SRB.
Configuration information of a physical channel.
Configuration information of a transport channel
Configuration information of a logic channel.
Uplink tunnel information. Corresponding to the Approaches 1 and 3 of establishing a user plane tunnel for transmitting RRC messages between the DU and the CU, the radio bearer configuration message includes uplink tunnel information allocated by the CU. The channel information is transmitted for RRC messages on all other SRBs other than the SRB0. Or for each SRB, channel information is allocated.

The radio bearer configuration request message may be a UE context establishment request or may be named otherwise, which does not affect the main content of the present disclosure.

Step 504, the DU configures resources. The DU sends a radio bearer configuration response message to the CU. The radio bearer configuration response message may include one or more of the following.

CU UE AP ID allocated for the UE by the CU.
DU UE AP ID allocated for the UE by the DU.
RB information configured for the UE. The RB information is configuration information of an SRB. Corresponding to the Approach 3 for establishing a user plane tunnel for transmitting RRC messages between the DU and the CU, the radio bearer configuration response message includes information of a downlink tunnel allocated by the DU.
C-RNTI allocated for the UE by the DU.

In the method of the present disclosure, the DU may send the C-RNTI allocated for the UE by the DU to the CU through this step or through the step 502. When the CU receives the C-RNTI allocated for the UE by the DU, the CU stores it. In this way, the CU knows the C-RNTI allocated for the UE by the DU in the cell, and during the handover procedure, when the CU needs to allocate a C-RNTI for the UE, the CU selects a C-RNTI unallocated in the cell to the UE.

The radio bearer configuration response message may be a UE context establishment response or may be named otherwise, which does not affect the main content of the present disclosure.

Step 505, the CU sends a downlink RRC transfer message to the DU. The downlink RRC transfer message includes one or more of the following:

CU UE AP ID configured for the UE by the CU;
DU UE AP ID configured for the UE by the DU;
RRC message. The RRC message in the present embodiment is an RRC connection establishment message. The CU may send a C-RNTI allocated to the UE to the UE through the RRC message.
Information of a logic channel for sending the RRC message.
Uplink tunnel information. Corresponding to the second Approach for establishing a user plane tunnel for transmitting RRC messages between the DU and the CU, the downlink RRC transfer message includes uplink tunnel information allocated by the CU. The uplink tunnel information is transmitted for RRC messages on other SRBs except for the SRB0. Or, for each SRB, there is one piece of channel information allocated.

The CU may send the RRC connection establishment message to the DU through the message in the step 503. Corresponding to this method, the step 505 may not be performed.

Step 506, the DU sends the RRC message received to the UE.

Step 507, the UE sends an RRC connection establishment completion message to the base station.

Step 508, the DU sends the received RRC message to the CU through the control plane or the user plane. The DU knows that the received RRC message is a message, from which UE according to the message received from the allocated DCCH resource.

Corresponding to the method of sending the received RRC message to the CU through the control plane, the DU sends an uplink RRC transfer message to the CU. The uplink RRC transfer message may include one or more pieces of the following information:

CU UE AP ID allocated for the UE by the CU.
DU UE AP ID allocated for the UE by the DU.
RRC message. In the present embodiment, the RRC message is an RRC connection establishment completion message.

Corresponding to the method of sending RRC messages on SRBs except for that on the SRB0 to the CU through the user plane, the DU sends an uplink RRC message to the CU through the GTP-U.

Corresponding to the method of sending RRC messages on SRBs except for that on the SRB0 through a user plane tunnel, the header of a packet on the user plane may include SRB information, e.g., an SRB1 or an SRB2. Or the CU may indirectly know the SRB information in a received RRC message by analyzing the RRC message.

Corresponding to the method of sending the RRC messages on other SRBs except for that on the SRB0, in which each SRB corresponds to one user plane tunnel, the DU selects an established user plane tunnel to transmit the RRC message to the CU according to the SRB in the RRC message received.

Step 509, the CU sends an initial UE message to the AMF.

If the AMF needs only to send an NAS message to the UE, but does not need to establish a session, then the AMF sends a downlink NAS transfer message to the base station; if it needs to establish a session, then the AMF sends the initial context establishment request message of the step 510 to the base station.

Step 510, the AMF sends an initial UE context establishment request message to the CU.

If the CU receives the downlink NAS transfer message from the AMF, then the CU directly performs the subsequent steps, but does not need to perform the RB reconfiguration procedures in steps 511 to 5016.

The CU sends an RRC message downlink NAS transfer message to the DU through a control plane or a user plane.

Corresponding to the method of sending the RRC message to the DU through the control plane, the CU sends a downlink RRC transfer message to the DU. The downlink RRC transfer message may include one or more pieces of the following information:

CU UE AP ID allocated for the UE by the CU.
DU UE AP ID allocated for the UE by the DU.
RRC message. In the present embodiment, the RRC message is a downlink NAS transfer message.

Corresponding to the method of sending RRC messages on SRBs except for that on the SRB0 through the user plane, the CU sends the downlink NAS transfer message to the DU through the GTP-U.

Corresponding to the method of sending RRC messages on SRBs except for that on the SRB0 through a user plane tunnel, the header of a packet on the user plane may include SRB information, e.g., an SRB1 or an SRB2. The header of the packet on the user plane may also include information regarding on which logic channel, the RRC message is transmitted.

Corresponding to the method of sending RRC messages on SRBs except for that on the SRB0, in which each SRB corresponds to one user plane tunnel, the CU sends an RRC message to the DU through a corresponding channel, and the DU knows on which SRB, the RRC message is sent to the UE according to a channel in the received information.

Step 511, the CU sends a radio bearer reconfiguration request message to the DU. The radio bearer reconfiguration request message may include one or more pieces of the following information:

CU UE AP ID allocated for the UE by the CU.

DU UE AP ID allocated for the UE by the DU.

Information of an RB or RBs to be added. The information of the RB to be added includes an identity of the RB, configuration information of a physical channel of the RB, configuration information of a transport channel of the RB, configuration information of a logic channel of the RB, information of a QoS flow or QoS flows mapped on the RB and/or uplink tunnel information for the RB. The information of the QoS flow mapped on the RB includes a flow identity of the QoS flow and QoS information of the QoS flow. The uplink tunnel information includes a transport layer address and an uplink TEID.

Information of an RB or RBs to be reconfigured. The information of the RB to be reconfigured includes an identity of the RB, reconfiguration information of a physical channel of the RB, reconfiguration information of a transport channel of the RB, reconfiguration information of a logic channel of the RB, information of a QoS flow or Qos flows to be added to the RB, information of a QoS flow or Qos flows to be deleted from the RB and/or information of a QoS flow to be transmitted on the RB. The information of the QoS flow to be added on the RB includes an identity of the QoS flow and QoS information of the QoS flow. The information of the QoS flow to be reconfigured on the RB includes an identity of the QoS flow and QoS parameters to be reconfigured. The information of the QoS flow to be deleted from the RB includes an identity of the QoS flow.

Information of an RB or RBs to be deleted. The information of the RB to be deleted includes an identity of the RB.

The data transfer through the user plane between the DU and the CU may be that multiple RBs share one GTP-U channel, or that each RB uses one GTP-U channel.

Step 512, the DU allocates resources. The DU sends a radio bearer reconfiguration response message to the CU. The radio bearer reconfiguration response message may include one or more of the following:

CU UE AP ID allocated for the UE by the CU.

DU UE AP ID allocated for the UE by the DU.

Configuration information of an RB. The configuration information of the RB includes an identity of the RB and downlink tunnel information allocated by the DU. The downlink tunnel includes a transport layer address and an uplink TEID.

Step 513, the CU sends an RRC message RRC connection reconfiguration to the DU through the control plane or the user plane.

Corresponding to the method of sending the RRC message to the DU through the control plane, the CU sends a downlink RRC transfer message to the DU. The downlink RRC transfer message may include one or more pieces of the following information:

CU UE AP ID allocated for the UE by the CU.

DU UE AP ID allocated for the UE by the DU.

RRC message. The RRC message in the present embodiment is an RRC connection reconfiguration message.

Corresponding to the method of sending RRC messages on SRBs except for that on the SRB0 through the user plane, the CU sends the RRC connection reconfiguration message to the DU through the GTP-U.

Corresponding to the method of sending RRC messages on SRBs except for that on the SRB0 through a user plane tunnel, the header of a packet on the user plane may include SRB information, e.g., an SRB1 or an SRB2. The header of the packet on the user plane may also include information regarding on which logic channel, the RRC message is transmitted.

Corresponding to the method of sending RRC messages on SRBs except for that on the SRB0, in which each SRB corresponds to one user plane tunnel, the CU sends an RRC message to the DU through a corresponding channel, and the DU knows on which SRB, the RRC message is sent to the UE according to a channel in the received information.

Step 5014, the DU sends the RRC message received from the CU to the UE.

Step 5015, the UE sends an RRC connection reconfiguration completion message to the base station.

Step 5016, the DU sends the received RRC message to the CU through the control plane or the user plane. The DU knows that the RRC message is a message of which UE according to the message received from the DCCH resources allocated.

Corresponding to the method of sending the received RRC message to the CU through the control plane, the DU sends an uplink RRC transfer message to the CU. The uplink RRC transfer message may include one or more pieces of the following information.

CU UE AP ID allocated for the UE by the CU.

DU UE AP ID allocated for the UE by the DU.

RRC message. The RRC message in the present embodiment is an RRC connection establishment reconfiguration completion message.

Corresponding to the method of sending RRC messages on SRBs except that on the SRB0 to the CU through the user plane, the DU sends the uplink RRC message to the CU through the GTP-U.

Corresponding to the method of sending RRC messages on SRBs except for that on the SRB0 through a user plane tunnel, the header of a packet on the user plane may include SRB information, e.g., the SRB1 or the SRB2. Or the CU may indirectly know the SRB information of the received RRC message by analyzing the RRC message.

Corresponding to the method of sending RRC messages on SRBs except for that on the SRB0, in which each SRB has one user plane tunnel, the DU selects to perform transfer on which established user plane tunnel according to the SRB of the RRC message received.

Till then, the description of the method for performing access for a UE is completed. Through the method, the problem of performing access for a UE is solved when the gNB is divided into a DU and a CU, and the method may be applicable to scenarios of Attach, PDU establishment, and so on, to guarantee that the DU and the CU support interconnection and intercommunication between devices of multiple manufacturers.

Embodiment 5

Figure 7:
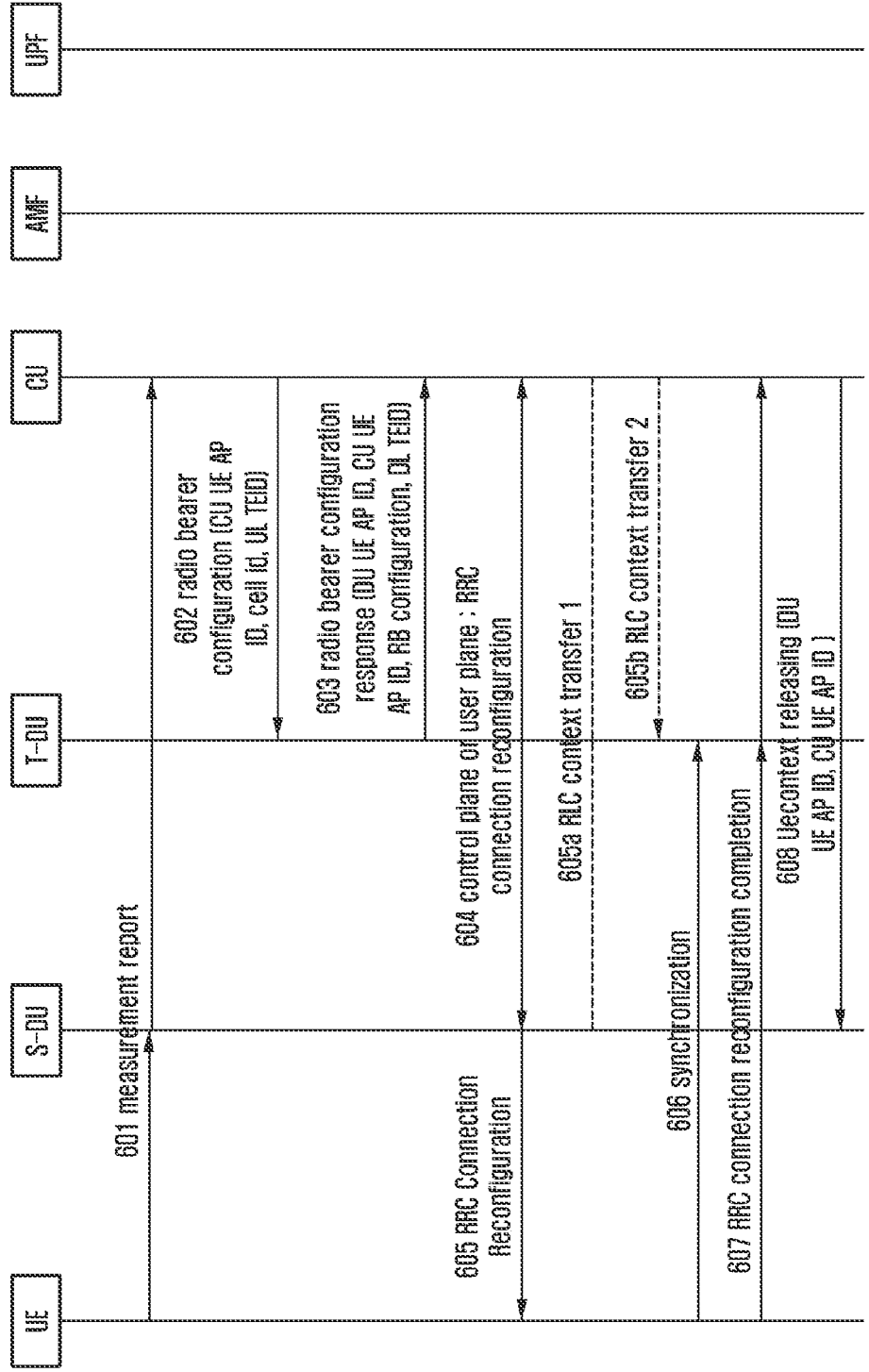
FIG. 7 is a schematic diagram of a method for performing a handover between different DUs of a same CU for a UE.

A method for performing a handover between different DUs of a same CU (i.e., a source DU and a target DU access to a same CU) for a UE is as shown in FIG. 7. Herein the detailed description irrelevant to the present disclosure is omitted, e.g., the procedures among an AMF and an SMF and a UPF. The method includes the following steps:

Step 601, the UE sends a measurement report message to a base station. After a DU receives an RRC message from the UE, it sends the RRC message to a CU through a control plane or a user plane. The method of sending the RRC message to the CU through the control plane or the user plane is the same as what described in step 508 and step 5016, and will not be elaborated herein. The DU in the step is a source DU (S-DU).

Step 602, the CU decides to initiate a handover for the UE. A target cell of the handover is in another DU. The CU decides to perform a normal handover or a make-before-break (MBB) handover. The CU sends a radio bearer configuration message to a target DU (T-DU), to request the T-DU to establish UE context and configure a radio bearer for the UE, and the radio bearer includes configurations of an SRB and a DRB.

The radio bearer configuration message may include one or more pieces of the following information:

CU UE AP ID allocated for the UE by the CU.
Context information of the UE on the S-DU. The context information of the UE on the S-DU includes a cell identity of a source cell where the UE is located, configuration information of an RB or RBs of the UE on the source cell, and/or UE capability information.
Identity of a target cell. The identity of the target cell is a global cell identity of the target cell or a cell identity unique on the DU or a cell identity unique on the CU.
Information of an RB or RBs to be configured by the T-DU. The RB included in the radio bearer configuration message may be an SRB and/or a DRB. In the present step, the RB to be configured is SRB and DRB information.
Configuration information of a physical channel.
Configuration information of a transport channel.
Configuration information of a logic channel.
Uplink tunnel information. Corresponding to each DRB, the radio bearer configuration message includes uplink tunnel information allocated by the CU. Corresponding to the method of sending RRC messages on SRBs except for that on the SRB0 through a user plane tunnel, the radio bearer configuration message includes uplink tunnel information allocated to the SRBs by the CU, and the uplink tunnel information may correspond to each SRB, or may be a tunnel commonly used for transmitting the RRC messages on SRBs except for that on the SRB0. The uplink tunnel information includes a transport layer address and a TEID.
MBB handover indication. The information may be contained when the CU decides to perform an MBB handover.

The radio bearer configuration message may be a UE context establishment request or may be named otherwise, which does not affect the main content of the present disclosure.

The present disclosure provides two methods of allocating a C-RNTI for the UE during a handover:

Method 1: The CU allocates a C-RNTI in a target cell where the UE is located for the UE;

Method 2: The target DU allocates a C-RNTI in a target cell for the UE.

Corresponding to the Method 1 of allocating a C-RNTI for the UE, the CU allocates the C-RNTI of the target cell where the UE is located for the UE. The CU sends the C-RNTI allocated to the target DU through a radio bearer configuration message. When the CU allocates the C-RNTI for the UE, it needs to guarantee the unique of the C-RNTI in the cell. Because in the UE initial access procedure, it is the DU that allocates a C-RNTI for the UE, and the DU will send the C-RNTI allocated for the UE to the CU, so that the CU can send the C-RNTI allocated for the UE to the UE through an RRC message. After the CU receives the C-RNTI allocated for the UE by the DU, it stores the C-RNTI, so that the CU can know that the DU has allocated the C-RNTI for the UE in the cell, and if during the handover procedure, the CU needs to allocate a C-RNTI for the UE, it selects a C-RNTI not allocated in the cell, and allocates it to the UE.

Step 603, the T-DU configures resources. The T-DU sends a radio bearer configuration response message to the CU. The radio bearer configuration response message may include one or more pieces of the following information:

CU UE AP ID allocated for the UE by the CU.
DU UE AP ID allocated for the UE by the T-DU.
RB information configured for the UE. The RB information includes SRB and DRB configuration information. Corresponding to each DRB, the radio bearer configuration response message includes information of a downlink tunnel allocated by the T-DU. Corresponding to the method of transmitting RRC messages on the other SRBs except for the SRB0 through the user plane, the message includes downlink tunnel information allocated for the SRBs by the T-DU, and the downlink tunnel information may correspond to each SRB, or may be a channel commonly used for transmitting the RRC messages on SRBs except for that on the SRB0. The downlink tunnel information includes a transport layer address and a TEID.

The radio bearer configuration response message may be a UE context establishment response, or may be named otherwise, which does not affect the main content of the present disclosure.

Corresponding to the Method 2 of allocating a C-RNTI for the UE, the target DU allocates the C-RNTI for the UE in the target cell where the UE is located. The target DU sends the allocated C-RNTI to the CU through a radio bearer configuration response message. When the DU allocates the C-RNTI for the UE, it needs to guarantee the unique of the C-RNTI in the cell.

Corresponding to the Method 1 of allocating a C-RNTI for the UE, the target DU stores the C-RNT contained in the radio bearer configuration message received. When next the target DU allocates a C-RNTI for the initially accessed UE, it does not use this C-RNTI. If the C-RNTI contained in the radio bearer configuration message received by the target DU has been allocated to another UE, then the DU processes this situation according to the following two approaches:

Approach 1: the target DU sends a radio bearer configuration failure message to the CU. The radio bearer configuration failure message may include a reason of failure: an invalid C-RNTI. The CU ends the procedure of handing over the UE to the T-DU.

Approach 2: the target DU allocates another C-RNTI unused to the UE, and sends the new C-RNTI to the CU through a radio bearer configuration response message. After the CU receives the new C-RNTI from the DU, the CU modifies the C-RNTI allocated to the UE.

Step 604, the CU sends an RRC connection reconfiguration message to the S-DU through the control plane or the user plane. The CU includes the C-RNTI of the target cell allocated to the UE into the RRC connection reconfiguration message, and the C-RNTI is allocated by the CU or by the target DU. Corresponding to the method of transmitting through the control plane, the CU sends a downlink RRC transfer message to the S-DU. The downlink RRC transfer message may include one or more pieces of the following information:

- CU UE AP ID allocated for the UE by the CU.
- DU UE AP ID allocated for the UE by the S-DU.
- RRC message. In the present embodiment, the RRC message is an RRC connection reconfiguration message.
- information of a logic channel for transmitting RRC messages.
- Information for performing a handover between different DUs. If the S-DU receives the information for performing a handover between different DUs, it stops transmitting data to the UE, the S-DU does not receive uplink data from the UE anymore after the S-DU sends the received RRC message to the UE.
- MBB handover indication. If the S-DU receives MBB handover indication information, then after it sends the RRC message received to the UE, it may continue to transmit data to the UE and receive uplink data from the UE. After the S-DU receives an indication of stopping data transmission from the CU, it stops transmitting downlink data to the UE and/or stopping receiving data from the UE. Or the S-DU decides when to stop transmitting data to the UE, e.g., when the S-DU does not receive an uplink acknowledgment from the UE anymore, the S-DU will stop transmitting data to the UE.

Corresponding to the method of sending the RRC connection reconfiguration message to the S-DU through the user plane, the CU sends the following information to the S-DU through a separate F1AP message, or includes the following information in a data packet header:

- Information of handover between different DUs. If the S-DU receives the information of handover between different DUs, it stops transmitting data to the UE, and does not receive uplink data from the UE anymore after the S-DU sends the received RRC message to the UE.
- MBB handover Indication. If the S-DU receives the MBB handover indication information, then after it sends the received RRC message to the UE, it may continue to transmit data to the UE and receive uplink data from the UE. When the S-DU receives the indication of stopping data transmission from the CU, it stops transmitting downlink data to the UE and/or stopping receiving data from the UE. Or the S-DU decides when to stop transmitting data to the UE, e.g., when the S-DU does not receive an uplink acknowledgement from the UE anymore, the S-DU stops transmitting data to the UE.

Corresponding to the method of sending the RRC connection reconfiguration message to the S-DU through the user plane, the data packet header further includes the CU UE AP ID allocated for the UE by the CU, the DU UE AP ID allocated for the UE by the S-DU and/or information of a logic channel for sending RRC messages.

Step 605, the DU sends the RRC message received to the UE.

Corresponding to the method of the CU deciding to use the MBB handover, and the CU deciding when the S-DU stops transmitting the downlink data to the UE or when the S-DU stops communicating with the UE, when the CU decides that the S-DU stops transmitting the downlink data to the UE or stopping communicating with the UE, the CU sends a data transfer stopping indication message to the S-DU. After the S-DU receives the corresponding data transfer stopping indication message from the CU, it stops communicating with the UE.

The CU may start to transmit data to the T-DU, and the CU transmits data not acknowledged by the UE and data received from the UPF to the T-DU. The data is a PDCP PDU.

There are two methods for transmitting the data herein:

Method 1: the CU directly sends data that has not been acknowledged by the UE and that is received from the UPF to the T-DU. The data is PDCP PDU. Data forwarding between the S-DU and the T-DU is not necessary.

Method 2: the CU directly sends data that has not been acknowledged by the UE and that is received from the UPF to the T-DU. The data is PDCP PDU. To avoid a situation where the target DU repeatedly transmitting some RLC PDUs that have been successfully transmitted to the UE by the source DU, the S-DU sends RLC context at the source DU side to the T-DU.

Corresponding to PDCP PDUs, a part of which have been successfully transmitted, the T-DU only transmits RLC PDUs that have not been received by the UE to the UE, and does not need to transmit all the RLC PDUs to the UE, so as to avoid repeatedly transmitting the data.

Corresponding to this method, step 605a and step 605b should be performed. This method is applicable to a situation where the T-DU and the S-DU have a same RB configuration.

Alternatively, the S-DU may also forward RLC PDUs that have not been acknowledged by the UE to the T-DU.

Step 605a, the S-DU sends a first RLC context transfer message to the CU. The first RLC context transfer message may include one or more pieces of the following information:

- CU UE AP ID allocated for the UE by the CU.
- DU UE AP ID allocated for the UE by the S-DU.
- RLC transfer status. The RLC transfer status includes the SN of the last GTP-U data packet that has been transmitted successfully, the SN(s) of GTP-U data packets that have not been transmitted successfully and/or the SN(s) of RLCs that have not been transmitted successfully.

Step 605b, the CU sends a second RLC context transfer message to the T-DU. The second RLC context transfer message may include one or more pieces of the following information:

- CU UE AP ID allocated for the UE by the CU.
- DU UE AP ID allocated for the UE by the T-DU.
- RLC transfer status. The RLC transfer status includes the SN of the last GTP-U data packet that has been transmitted successfully, the SN(s) of GTP-U data packets that have not been transmitted successfully and/or the SN(s) of RLCs that have not been transmitted successfully.
- PDCP transmission and receiving status. The PDCP transmission status includes the SN of the last GTP-U data packet that has been transmitted successfully, the SN(s) of GTP-U data packets that have not been transmitted successfully and/or the receiving status of uplink PDCPs.

The DU, according to the feedback from the UE on the RLC layer, determines that which PDCP data packets have been received by the UE, and which PDCP data packets have not been received by the UE, so as to decide the PDCP transmission and receiving status.

The RLC context transfer may be referred to as PDCP context transfer or may be named otherwise, which does not affect the main content of the present disclosure.

In the method of the present disclosure, only the step 605a may be performed, to notify the PDCP transmission and receiving status to the CU, so that the CU knows that is should send which PDCP data packets to the T-DU.

The step 605a and the step 605b are not mandatory steps for the present disclosure.

Step 606, the UE is synchronized to the target cell.

Step 607, the UE sends an RRC connection establishment completion message to the base station. The T-DU sends the RRC message received to the CU through the control plane or the user plane. The method for the DU sending the RRC message to the CU is the same as that in the step 5016, and will not be elaborated herein.

Step 608, the CU sends a UE context releasing message to the S-DU. The UE context releasing message includes the CU UE AP ID allocated for the UE by the CU, and the DU UE AP ID allocated for the UE by the S-DU.

Till then, the description of the method for performing a handover between different DUs for the UE is completed. Through the method, the problem of performing a handover for the UE is solved when the gNB is divided into DUs and a CU, which avoid data loss, and guarantees that the DUs and the CU support interconnection and intercommunication between devices of multiple manufacturers.

Embodiment 6

Figure 8:
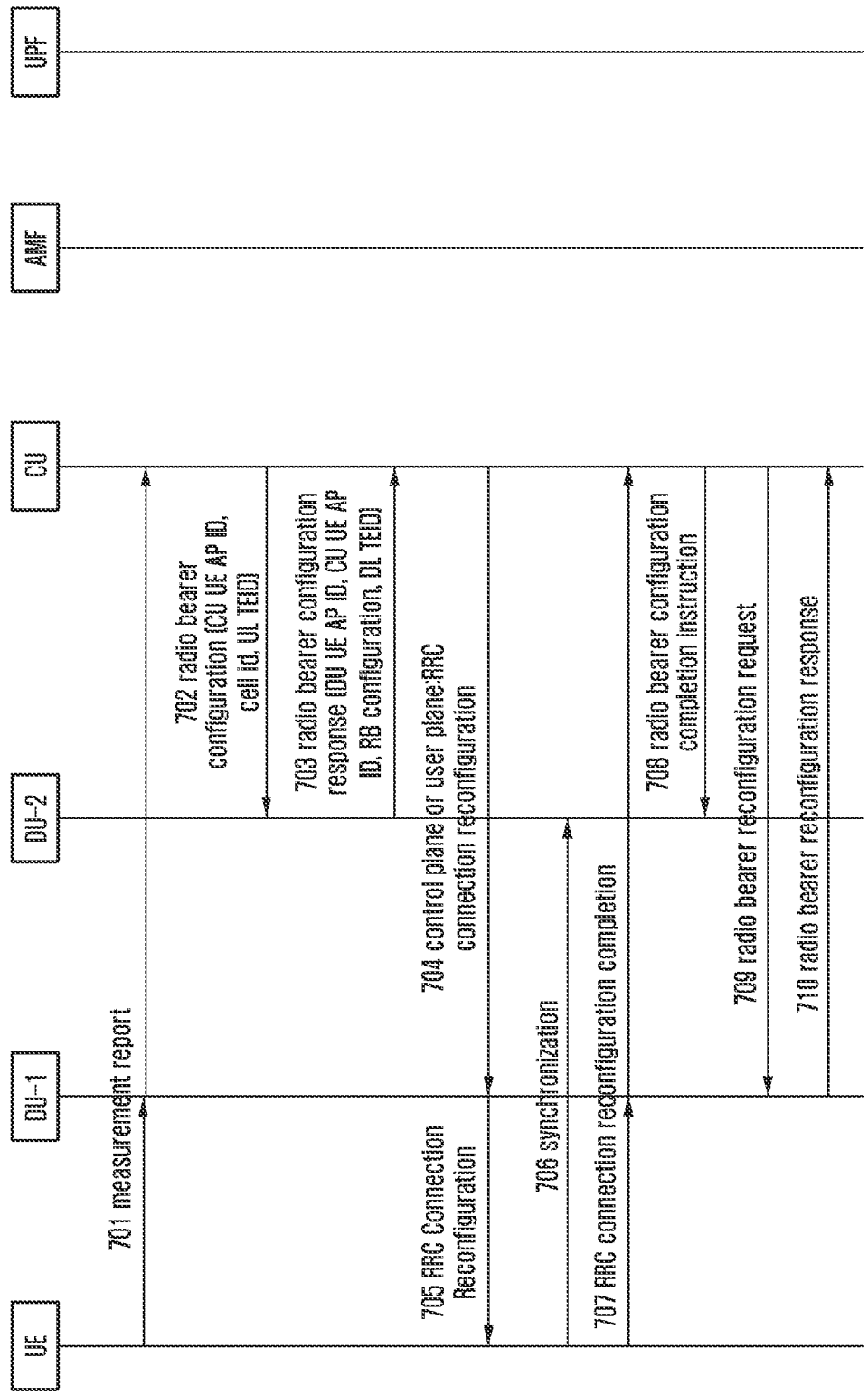
FIG. 8 is a schematic diagram of a method for performing access for a UE through different DUs of a same CU

A method for performing access for a UE through different DUs of a same CU (i.e., the UE performing access through a DU-1 and a DU-2, and the DU-1 and the DU-2 access to the same CU) according to the present disclosure is as shown in FIG. 8. Herein the detailed description of the steps irrelevant to the present disclosure is omitted, e.g., the procedures among the AMF and the SMF and the UPF. The method includes the following steps:

Step 701, the UE sends a measurement report message to a base station. After the DU receives the RRC message from the UE, it sends the RRC message received to the CU through a control plane or a user plane. How to send the RRC message received to the CU through the control plane or the user plane is the same as those in step 508 and step 5016, and will not be elaborated herein. The DU of the present step is a DU (the DU-1) that serves the UE.

Step 702, according to the measurement report message from the UE, the CU decides to switch a part of bearers of the UE to a cell of the DU-2. The CU decides whether to perform a normal handover or an MBB handover. The CU sends a radio bearer configuration message to the DU-2, to request the DU-2 to establish UE context and configure a radio bearer for the UE. The CU decides whether to switch a part of DRBs or all DRBs to the DU-2. If the SRB is also switched to the DU-2, it means that this is a handover from the DU-1 to the DU-2, and meanwhile, the DRBs are established on the DU-2, and this procedure is equal to a combination of the handover procedure in FIG. 6 and the procedure of switching a part of or all of DRBs to the DU-2, which will not be elaborated herein. The radio bearer configuration message may include one or more of the following information elements:

CU UE AP ID allocated for the UE by the CU.
Context information of the UE on the DU-1. The context information of the UE includes a cell identifier of a DU-1 cell where the UE is located, RB configuration information of the UE on the DU-1 cell and/or UE capability information.
Identity of a target cell. The identity of the target cell is a global cell identity or a cell identity unique on the DU or a cell identity unique on the CU.
Information of RBs to be configured on the DU-2.
Configuration information of a physical channel.
Configuration information of a transport channel.
Configuration information of a logic channel.
Uplink tunnel information. Corresponding to each DRB, the radio bearer configuration message includes uplink tunnel information allocated by the CU. The uplink tunnel information includes a transport layer address and a TEID.
MBB handover indication.

The radio bearer configuration message may be a UE context establishment request or may be named otherwise, which does not affect the main content of the present disclosure.

There are two methods of allocating a C-RNTI for the UE:
Method 1: the CU allocates a C-RNTI on the DU-2 cell for the UE;
Method 2: the DU-2 allocates a C-RNTI on the DU-2 cell for the UE.

Corresponding to the Method 1 of allocating a C-RNTI for the UE, the CU allocates a C-RNTI of the DU-2 cell where the UE is located for the UE. The CU sends the C-RNTI allocated to the DU-2 through the radio bearer configuration message. When the CU allocates the C-RNTI for the UE, it needs to guarantee the unique of the C-RNTI in the cell. Because in the UE initial access procedure, it is the DU that allocates a C-RNTI for the UE, and the DU will send the C-RNTI allocated for the UE to the CU, so that the CU can send the C-RNTI allocated for the UE to the UE through an RRC message. After the CU receives the C-RNTI allocated for the UE by the DU, it stores the C-RNTI, so that the CU can know that the DU has allocated the C-RNTI for the UE in the cell, and if the CU needs to allocate a C-RNTI for the UE, it selects a C-RNTI not allocated in the cell, and allocates it to the UE.

Step 703, the DU-2 configures resources. The DU-2 sends a radio bearer configuration response message to the CU. The radio bearer configuration response message may include one or more of the following information elements:

CU UE AP ID allocated for the UE by the CU.
DU UE AP ID allocated for the UE by the DU-2.
RB Information configured for the UE. Corresponding to each RB, the radio bearer configuration response message contains downlink tunnel information allocated by the DU-2. The downlink tunnel information includes a transport layer address and a TEID.

The radio bearer configuration response message may be a UE context establishment response message, or may be named otherwise, which does not affect the content of the present disclosure.

Corresponding to the Method 2 of allocating a C-RNTI for the UE, the DU-2 allocates a C-RNTI of the DU-2 cell where the UE is located. The DU-2 sends the C-RNTI allocated to the CU through a radio bearer configuration response message. When the DU-2 allocates C-RNTI for the UE, it needs to guarantee the unique of the C-RNTI in the cell.

Corresponding to the Method 1 of allocating a C-RNTI for the UE, the DU-2 stores the C-RNTI contained in the radio bearer configuration message received. The DU-2 will not use the C-RNTI when it allocates a C-RNTI for the UE next time. If the C-RNTI included in the radio bearer configuration message received by the DU-2 has been allocated to another UE, then the DU-2 has two approaches to process this situation:

Approach 1: the DU-2 sends a radio bearer configuration failure message to the CU. The radio bearer configuration failure message may include a reason of failure: an invalid C-RNTI. The CU ends the procedure of configuring the UE to the DU-2.

Approach 2: the DU-2 allocates another C-RNTI unused to the UE, and sends the new C-RNTI to the CU through a radio bearer configuration response message. After the CU receives the new C-RNTI from the DU-2, it modifies the C-RNTI allocated to the UE using the new C-RNTI from the DU-2.

Step 704, the CU sends an RRC connection reconfiguration message to the DU-1 through the control plane or the user plane. The CU includes the C-RNTI in the DU-2 cell allocated for the UE into the RRC connection reconfiguration message. The C-RNTI is allocated by the CU or by the DU-2. Corresponding to the method of transfer RRC message through the control plane, the CU sends a downlink RRC transfer message to the DU-1. The downlink RRC transfer message may include one or more pieces of the following information:

CU UE AP ID allocated for the UE by the CU.

DU UE AP ID allocated for the UE by the DU-1.

RRC message. In the present embodiment, the RRC message is an RRC connection reconfiguration message.

Information of a logic channel for transmitting the RRC message.

Information of an RB or RBs to be switched. The information of the RB to be switched includes an RB identifier, a target DU identity and/or a target cell identity. For the RB to be switched, after the DU-1 sends the RRC message received to the UE, it stops transmitting data to the UE, and does not receive uplink data from the UE anymore. The CU may send the information of the RB to be switched to the DU-1 through a separate message. Corresponding to the method, the message, through which the CU notifies the DU of the information of the RB to be switched, may be sent before or after the present step.

MBB handover indication. If the DU-1 receives an MBB handover indication, then after the DU-1 sends the RRC message received to the UE, it may continue to send data to the UE and receive uplink data from the UE on the RB to be switched. After the DU-1 receives a data transmission stopping indication from the CU, it stops transmitting downlink data to the UE and/or stops receiving data from the UE on the corresponding RB. Or the DU-1 decides when to stop transmitting the data to the UE, e.g., the DU-1 stopping transmitting data to the UE after it does not receive uplink acknowledgment from the UE anymore.

Step 705, the DU-1 sends the RRC message received to the UE.

Corresponding to the method of the CU deciding to use the MBB handover, and the CU deciding when the DU-1 to stop transmitting downlink data to the UE or stop communicating with the UE on the RB to be switched, the CU sends a data transmission stopping message to the DU-1. After the DU-1 receives the corresponding message from the CU, it stops communicating with the UE on the RB to be switched.

The CU may start to transmit data to the DU-2 on the RB, to which the handover is performed, and the CU transmits data that has not been acknowledged by the UE and that has been received by the UPF to the DU-2. The data is PDCP PDU.

For the RB to be switched, there are two methods of transmitting data as follows:

Method 1, the CU directly transmits data that has not been acknowledged by the UE and that is received from the UPF to the DU-2. The data is PDCP PDU. The data forwarding between the DU-1 and the DU-2 is not necessary.

Method 2, the CU directly transmits data that has not been acknowledged by the UE and that is received from the UPF to the DU-2. The data is PDCP PDU. To avoid a situation where the DU-2 repeatedly transmits some RLC PDUs that have been successfully transmitted to the UE by the DU-1, the DU-1 sends RLC context at the source side to the DU-2. Corresponding to PDCP PDUs, a part of which have been successfully transmitted, the DU-2 only transmits RLC PDUs that have not been received by the UE to the UE, and does not need to transmit all the RLC PDUs to the UE, so as to avoid repeatedly transmitting the data. Corresponding to this method, a step similar to step 605*a* and step 605*b* should be performed, and the DU-1 sends the RLC context to the DU-2 through the CU. The difference between the step and the step 605*a* and the step 605*b* is that the RLC context is only intended for an RB to be switched, and the S-DU is the DU-1, and the T-DU is the DU-2, the other parts are same, which will not be elaborated herein. The method is applicable to a situation where the RB configurations in the DU-1 and the DU-2 are same. Alternatively, the DU-1 may forward RLC PDUs that have not been acknowledged by the UE to the DU-2. The step 605*a* and the step 605*b* are not mandatory steps of the present disclosure.

Step 706, the UE is synchronized to the target cell.

Step 707, the UE sends an RRC connection establishment completion message to the base station. The DU-1 sends the RRC message received to the CU through the control plane or the user plane. The DU-1 sends the RRC message to the CU through a method same as that in step 5016, which will not be elaborated herein.

Step 708, the CU sends a radio bearer configuration completion indication message to the DU-2, and sends the RB configuration information received from the UE to the DU-2. The RB configuration information may only include a delta configuration, i.e., a difference between the configuration configured by the DU-2 for the UE, but the actual configuration in the UE. The message may include full configurations of the UE.

Step 709, the CU sends a radio bearer reconfiguration or RB releasing message to the DU-1. The radio bearer reconfiguration or RB releasing message includes the CU UE AP ID allocated for the UE by the CU, and a DU UE AP ID allocated for the UE by the DU-1. The message includes information of an RB to be released, or information of an RB which is switched to the DU-2 successfully. The RB information includes an RB identifier.

Step 710, the DU-1 sends a radio bearer re-configuration response or an RB releasing response message to the CU.

Till then, the description of the method for performing access for a UE through different DUs of a same CU is completed. Through the method, the problem of performing access for the UE through different DUs is solved when a gNB is divided into DUs and a CU, which improves the throughput of the UE, avoids data loss on the switched bearers, and guarantees that the DUs and the CU support interconnection and intercommunication between devices of multiple manufacturers.

The methods of establishing a fronthaul interface, methods of performing access for a UE, and methods for performing a handover for a UE may solve the communication problem raised when a gNB is divided into DUs and a CU, reduce the configuration cost of the operator, improves the throughput of the UE, avoids data loss, and guarantees that the DUs and the CU support interconnection and intercommunication between devices of multiple manufacturers.

The present disclosure provides a method for enhancing the function of a UE and achieving data forwarding in a 5G communication network. In this method, a UE enters an enhanced mode upon receiving an indication from a base station and forwards data between the base station and other UEs in the enhanced mode. By this method, a UE having an enhanced function may provide a data forwarding function for other UEs. In this way, the QoS of UEs having a poor channel condition is improved and the user experience is further improved. The UE in the enhanced mode corresponds to the first UE mentioned in the claims, hereinafter referred to as enUE; and other UEs correspond to the second UE mentioned in the claims.

By the method of the present disclosure, data transmission may still be scheduled by the base station, and may also be scheduled by the UE entering the enhanced mode.

Wherein, if data transmission is still scheduled by the base station, the UE entering the enhanced mode (hereinafter referred to as enUE) receives, from the base station, scheduling information on time-frequency resources of other UEs scheduled by the base station; and forwarding, by the UE, data between the base station and other UEs includes: by the UE, receiving downlink data sent to other UEs from a base station, processing the downlink data layer by layer by a protocol stack structure corresponding to the UE in the enhanced mode, and forwarding, to the corresponding other UEs, the downlink data on the corresponding time-frequency resources according to the scheduling information on the time-frequency resources of other UEs; and/or by the UE, receiving uplink data sent to a base station from other UEs on corresponding time-frequency resources according to the scheduling information on the time-frequency resources of other UEs, processing the uplink data layer by layer by a protocol stack structure corresponding to the UE in the enhanced mode, and forwarding the uplink data to the base station. In this scheduling way, optionally, the base station may further transmit context information and timing information of other UEs to the enUE. In this case, the enUE is required to advance or delay corresponding time according to the timing information. The timing information is time information to be advanced or delayed when the enUE forwards data of other UEs.

If data transmission is scheduled by the UE entering the enhanced mode, the UE entering the enhanced mode transmits scheduling information on time-frequency resources to other UEs; and forwarding, by the UE, data between the base station and other UEs includes: by the UE, receiving downlink data sent to other UEs from a base station, processing the downlink data layer by layer by a protocol stack structure corresponding to the UE in the enhanced mode, and forwarding, to other UEs, the downlink data on the corresponding time-frequency resources according to the scheduling information; and/or by the UE, receiving uplink data sent to a base station from other UEs on corresponding time-frequency resources according to the scheduling information, processing the uplink data layer by layer by a protocol stack structure corresponding to the UE in the enhanced mode, and forwarding the uplink data to the base station.

Based on the above two scheduling modes, the enUE may form a new cell and accept the access of other UEs in this new cell, or may not form a new cell. If the enUE forms a new cell, the enUE needs to receive, from the base station, cell configuration information and access information used by other UEs to access the enUE, and transmit the access information and allow other UEs to access the enUE according to an access request from other UEs.

Based on the above description, the technical data forwarding solutions of the present disclosure may be summarized as the following several preferred modes.

1. The enUE forms a new cell and the new cell operates in an independent mode.

Information sent to the enUE by the base station at least includes one of the following information (the following information is mainly information used by the enUE to serve other UEs):

a protocol stack structure information used in the enhanced mode;

configuration information of each protocol layer in the used protocol stack structure; and configuration information of the formed new cell, for example, cell ID, operating frequency information, bandwidth information, information carried by a broadcast channel, information carried by a synchronization channel, configuration information of an access channel used by a user to access the new cell, and more.

Information sent to other UEs by the base station includes:

configuration information of the new cell that other UEs access, for example, cell ID, operating frequency information, bandwidth information, information carried by a broadcast channel, information carried by a synchronization channel, configuration information of an access channel used by a user to access the new cell, and more.

2. The enUE forms a new cell and the new cell operates in a non-independent mode.

Information sent to the enUE by the base station at least includes one of the following information (the following information is mainly information used by the enUE to serve other UEs):

a protocol stack structure information used in the enhanced mode;

configuration information of each protocol layer in the used protocol stack structure;

configuration information of the formed new cell, for example, cell ID, operating frequency information, bandwidth information, information carried by a broadcast channel, information carried by a synchronization channel, configuration information of an access channel used by a user to access the new cell, and more.

Information sent to other UEs by the base station includes:

configuration information of the new cell that other UEs access, for example, cell ID, operating frequency information, bandwidth information, information carried by a broadcast channel, information carried by a synchronization channel, configuration information of an access channel used by a user to access the new cell, and more.

The difference between the above two modes lies in that, in the first mode, the enUE transmits access information to the new cell according to the configuration information of the base station, and in the second mode, the enUE may not transmit access information to the new cell, or the enUE transmits only information on the synchronization channel.

3. The enUE does not form a new cell.

Information sent to the enUE by the base station at least includes one of the following information (the following information is mainly information used by the enUE to serve other UEs):

a protocol stack structure information used in the enhanced mode;

configuration information of each protocol layer in the used protocol stack structure; and timing indication information for serving other UEs, the indication information being used to indicate the amount of time to be delayed or advanced when the enUE receives and/or transmits data of other UEs.

The base station is not required to transmit additional information to other UEs. Processing may be performed according to the existing methods in the prior art.

Figure 9:
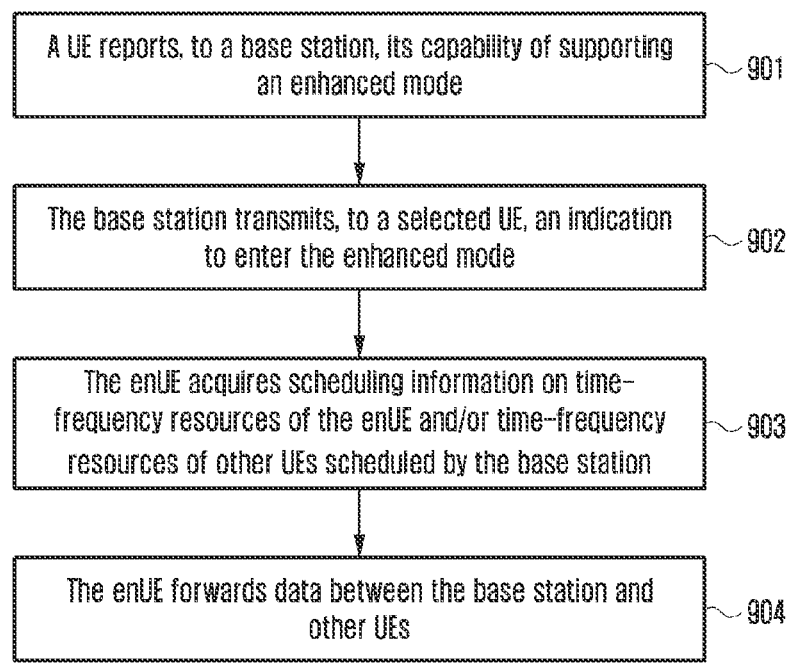
FIG. 9 is a schematic diagram of a preferred data forwarding method according to the present disclosure.

FIG. 9 is a flowchart of a preferred method according to the present disclosure, including the following steps.

Step 901: A UE reports, to a base station, its capability of supporting an enhanced mode.

This step is an optional step. The base station may know a UE's capability of supporting an enhanced mode in other ways. For example, it is considered that a UE supports the enhanced mode if this UE reports the channel state information on one or more carriers between the UE and other surrounding UEs. If a UE supports the enhanced mode, the UE may further report a protocol stack structure information (which will be described in detail below) supported in the enhanced mode. To express the protocol stack structure, the following method may be used: a protocol stack structure is represented by explicit indication information. For example, "1" represents a first structure, "2" represents a second structure, and so on. Alternatively, configuration information of each protocol layer in a protocol stack used by the enUE to serve other UEs may be directly given.

Step 902: The base station transmits, to a selected UE, an indication to enter the enhanced mode.

Correspondingly, the base station may also indicate the selected UE to exit the enhanced mode by issuing signaling.

Preferably, the base station may select a UE having a good channel condition to enter the enhanced mode, in order to forward data between a UE having a poor channel condition and the base station.

Step 903: The UE in the enhanced mode (hereinafter referred to as enUE) acquires scheduling information on time-frequency resources of this UE and/or time-frequency resources of other UEs scheduled by the base station. The method for acquiring the scheduling information may be based on a definite signaling between the base station and the UE, or realized in other ways, for example, the time-frequency resources are configured statically.

This step is an optional step. If the UE forms an independent new cell after entering the enhanced mode or the scheduling of data of other UEs is executed by the enUE, the data may be forwarded between the base station and other UEs even without the scheduling information of the base station.

Step 904: The UE in the enhanced mode forwards data between the base station and other UEs.

Specifically, the UE in the enhanced mode may receive downlink data sent to other UEs from the base station, process the downlink data layer by layer by a protocol stack structure corresponding to the enUE in the enhanced mode, and forward the downlink data to one or more served UEs; Alternatively, the UE in the enhanced mode may receive uplink data sent to the base station from one or more served UEs, process the uplink data layer by layer by a protocol stack structure corresponding to the enUE in the enhanced mode, and forward the uplink data to the base station.

In the following description, actions on the base station side will be described by taking gNB as an example.

In the step 902, to configure the enhanced mode of a UE, the gNB needs to provide, to the UE, at least one of the following information a to d:

a. A protocol stack structure information used when serving other UEs (that is, when forwarding data for other UEs)

Figure 10:
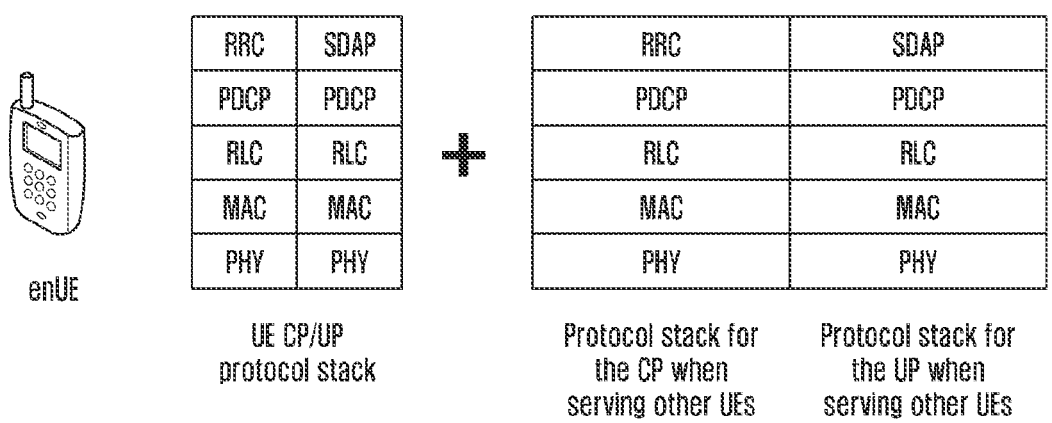
FIG. 10 is a schematic diagram of a protocol stack structure B0 for a UE according to the present disclosure.

In addition to a protocol stack used by the UE to transmit and receive its own data, the protocol stack structure used when the enUE serves other UEs (that is, when the enUE receives downlink data from the gNB and forwards it to other UEs, and/or when the enUE receives uplink data from other UEs and forwards it to the gNB) at least includes one of the following structures:

Protocol stack structure B0, including: a Service Data Adaptation Protocol (SDAP) layer, a Radio Resource Control (RRC) layer, a Packet Data Convergence Protocol (PDCP) layer, a Radio Link Control (RLC) layer, a Media Access Control (MAC) layer and a PHY layer. For example, a protocol stack used for data transmission in the user plane includes an SDAP layer, a PDCP layer, an RLC layer, an MAC layer and a PHY layer; and a protocol stack used for data transmission in the control plane includes an RRC layer, a PDCP layer, an RLC layer, an MAC layer and a PHY layer, as shown in FIG. 10.

Figure 11:
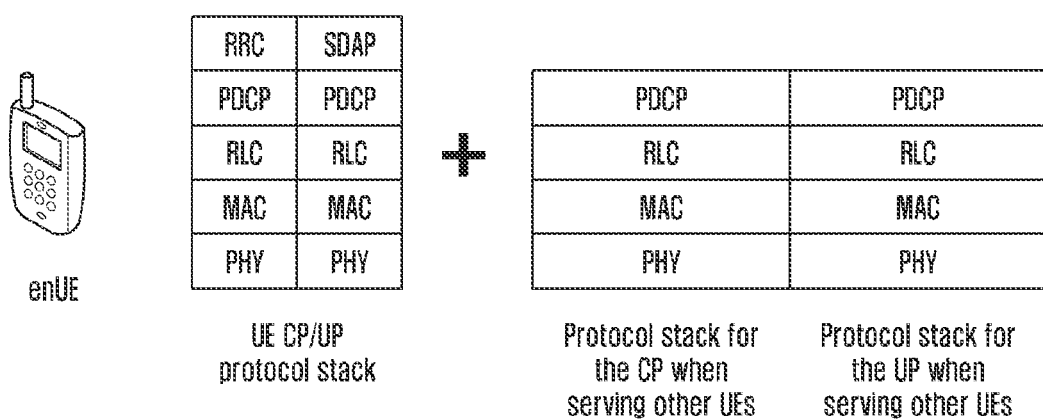
FIG. 11 is a schematic diagram of a protocol stack structure B1 for a UE according to the present disclosure.

Protocol stack structure B1, including: a PDCP layer, an RLC layer, an MAC layer and a PHY layer. For example, a protocol stack used for data transmission in the user plane includes a PDCP layer, an RLC layer, an MAC layer and a PHY layer; and a protocol stack used for data transmission in the control plane includes a PDCP layer, an RLC layer, an MAC layer and a PHY layer, as shown in FIG. 11.

Figure 12:
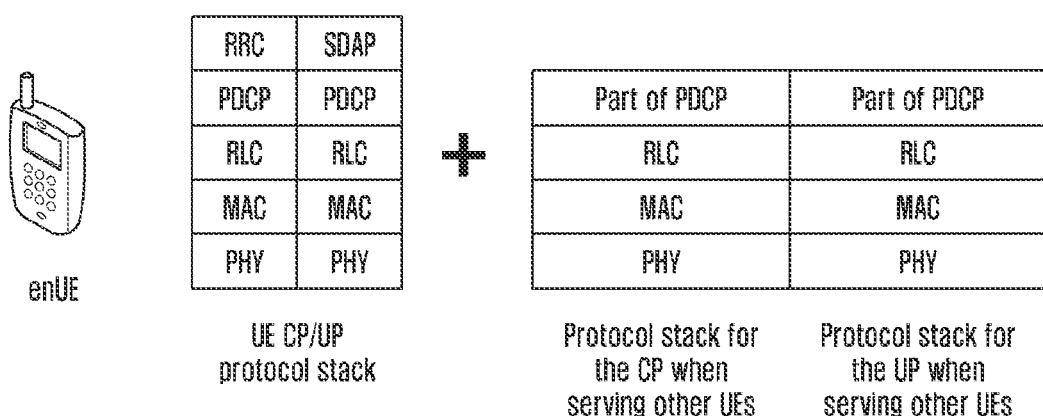
FIG. 12 is a schematic diagram of a protocol stack structure B2 for a UE according to the present disclosure.

Protocol stack structure B2, including: part of a PDCP layer, an RLC layer, an MAC layer and a PHY layer, as shown in FIG. 12. In one embodiment, part of a PDCP layer includes data integrity protection, and other functions of the PDCP layer are on the gNB side.

Figure 13:
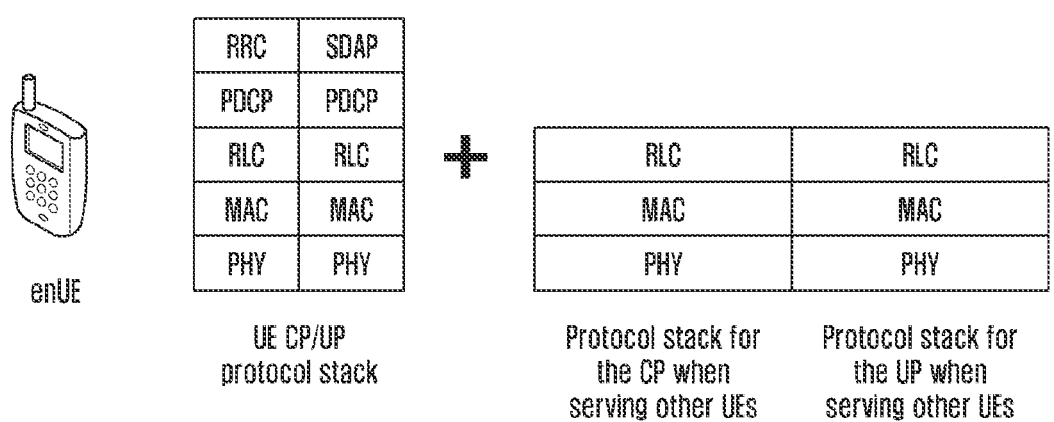
FIG. 13 is a schematic diagram of a protocol stack structure B3 for a UE according to the present disclosure.

Protocol stack structure B3, including: an RLC layer, an MAC layer and a PHY layer, as shown in FIG. 13.

Figure 14:
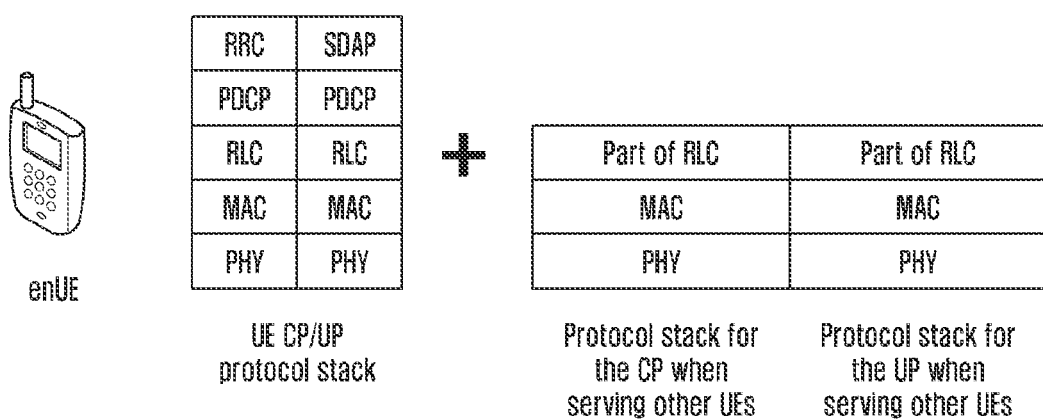
FIG. 14 is a schematic diagram of a protocol stack structure B4 for a UE according to the present disclosure.

Protocol stack structure B4, including: part of an RLC layer, an MAC layer and a PHY layer, as shown in FIG. 14. In one embodiment, part of an RLC layer includes a segmentation function, and other functions of the RLC layer are on the gNB side.

Figure 15:
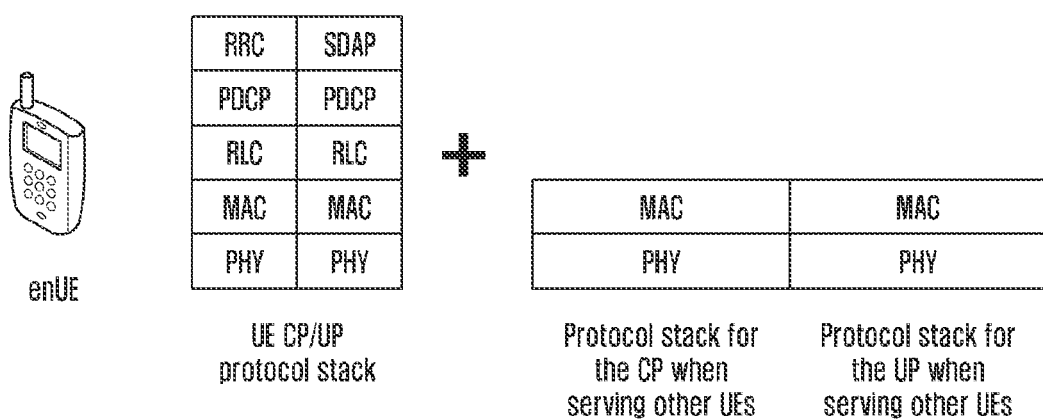
FIG. 15 is a schematic diagram of a protocol stack structure B5 for a UE according to the present disclosure.

Protocol stack structure B5, including: an MAC layer and a PHY layer, as shown in FIG. 15.

Figure 16:
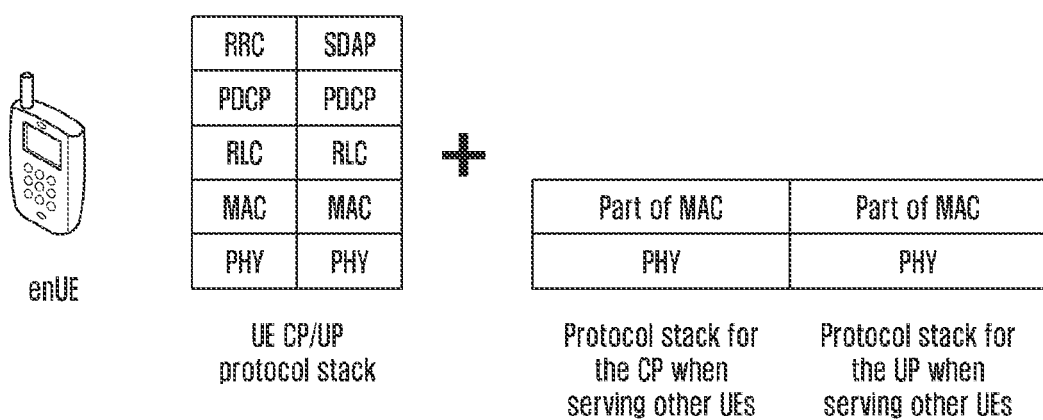
FIG. 16 is a schematic diagram of a protocol stack structure B6 for a UE according to the present disclosure.

Protocol stack structure B6, including: part of an MAC layer and a PHY layer, as shown in FIG. 16. In one embodiment, part of an MAC layer includes functions having high time delay requirement, for example, HARQ, and other functions of the MAC layer are on the gNB side, for example, scheduling.

Figure 17:
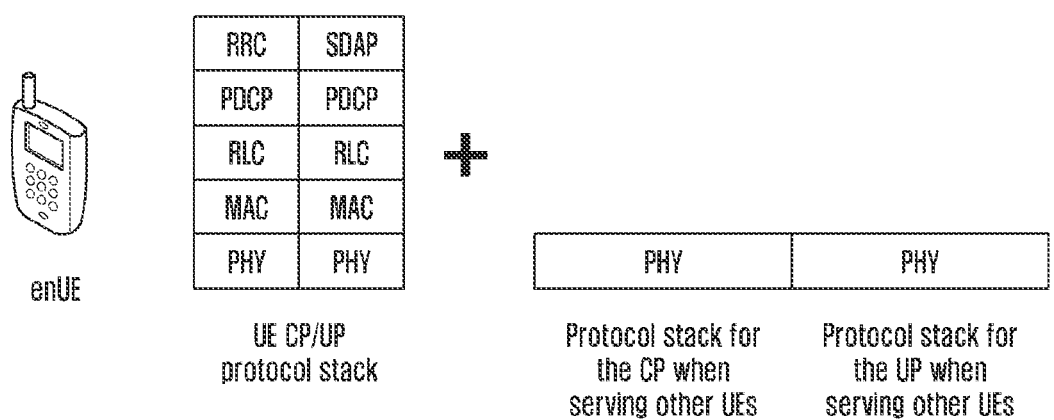
FIG. 17 is a schematic diagram of a protocol stack structure B7 for a UE according to the present disclosure.

Protocol stack structure B7, including: a PHY layer, as shown in FIG. 17.

Figure 18:
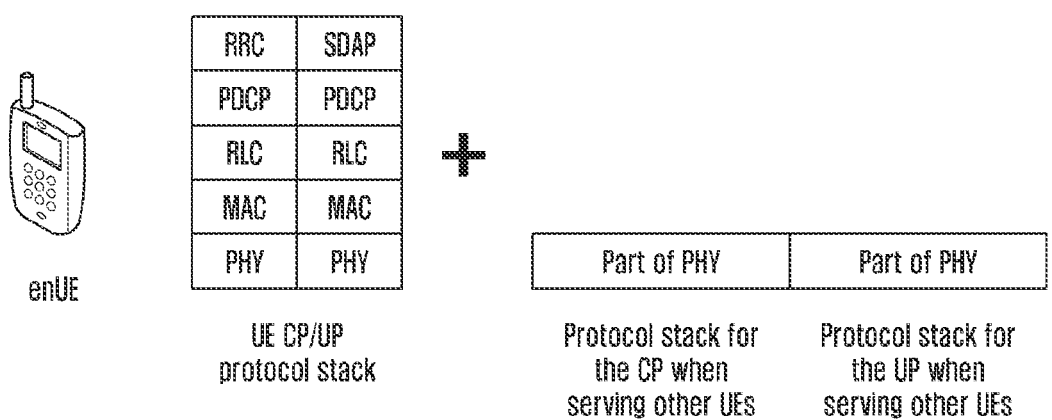
FIG. 18 is a schematic diagram of a protocol stack structure B8 for a UE according to the present disclosure.

Protocol stack structure B8, including: part of a PHY layer, as shown in FIG. 18. In one embodiment, part of a PHY layer includes iFFT of the downlink signal and the addition of a cyclic prefix to the downlink signal, and FFT of the uplink signal and the removal of a cyclic prefix, and other functions of the PHY layer are on the gNB side.

To express the protocol stack structure, the following methods may be used.

Method 1: A protocol stack structure is represented by explicit indication information. For example, "1" represents structure B1, "2" represents structure B2, and so on.

Method 2: Configuration information of each protocol layer in a protocol stack used by the enUE to serve other UEs may be directly given. For example, if protocol stack structure B3 is used, the given information includes configuration information of the RLC layer, configuration information of the MAC layer, and configuration information of the PHY layer: and if protocol stack structure B4 is used, the given information includes part of configuration information of the RLC layer, configuration information of the MAC layer, and configuration information of the PHY layer.

b. Information on a plane that the protocol stack structure serves (for example, the user plane, the control plane, or both the user plane and the control plane). This information is optional information. If this information is not included, it is indicated that a plane that the protocol stack structure serves includes the user plane and the control plane, or that a plane that the protocol stack structure serves is a default plane.

In addition to the transmission and reception of the own data of the enUE, the protocol stack used by the enUE may be used only for data transmission of the user plane of other UEs, or only for data transmission of the control plane of other UEs, or for data transmission of both the user plane and the control plane of other UEs.

When the enUE serves other UEs, the protocol stack used for data transmission of the user plane may be different from the protocol stack used for data transmission of the control plane. The protocol stack used for data transmission in the control plane and the user plane may be in any one of the above structures B0 to B8.

As an example, during the data transmission of the user plane, the protocol stack used by the enUE is a protocol stack indicated by B1 (including a PDCP layer, an RLC layer, an MAC layer and a PHY layer), and during the data transmission of the control plane, the protocol stack used by the enUE is a protocol stack indicated by B6 (including an MAC layer and a PHY layer).

As another example, during the data transmission in the user plane, the protocol stack used by the enUE is a protocol stack indicated by B3 (including an RLC layer, an MAC layer and a PHY layer), and during the data transmission in the control plane, the protocol stack used by the enUE is a protocol stack indicated by B1 (including a PDCP layer, an RLC layer, an MAC layer and a PHY layer).

c. a data transmission direction information of a plane that the protocol stack structure serves (for example, uplink, or downlink, or both uplink and downlink). This information is optional information. If this information is not included, it is indicated that the data transmission direction in a plane that the protocol stack structure serves includes uplink and downlink, or that the data transmission direction in a plane that the protocol stack structure serves is a default direction.

In addition to the transmission and reception of the own data of the enUE, the protocol stack used by the enUE may be used for forwarding of only a downlink signal of other UEs (the transmission of this downlink signal may be in only the control plane, in only the user plane, or in both the user plane and the control plane), or forwarding of only an uplink signal of other UEs (the transmission of this uplink signal maybe only in the control plane, only in the user plane, or both in the user plane and the control plane).

d. ID information of a user that the enUE serves. This information is optional information. If this information is not included, it is indicated that the enUE serves users all by the structures indicated by the above information a, b and c.

In this way, an enUE may serve different users by different protocol stack structures, different protocol stack structures may be configured for different enUEs, different protocol stack structures may be configured for different planes, and different protocol stack structures may be configured for different data transmission directions.

To configure the enhanced mode of an enUE, there are following possible configuration embodiments:

only a is configured;

only a and b are configured, or multiple sets (a1,b1), (a2,b2), . . . are configured;

only a and c are configured, or multiple sets (a1,c1), (a2,c2), . . . are configured;

only a and d are configured, or multiple sets (a1,d1), (a2,d2), . . . are configured;

only a, b and c are configured, or multiple sets (a1,b1,c1), (a2,b2,c2), . . . are configured:

only a, b and d are configured, or multiple sets (a1,b1,d1), (a2,b2,d2), . . . are configured;

only a, c and d are configured, or multiple sets (a1,c1,d1), (a2,c2,d2), . . . are configured; and a, b, c and d are configured, or multiple sets (a1,b1,c1,d), (a2,b2,c2,d2), . . . are configured.

Further, the base station may transmit, to a selected UE, configuration information related to forwarding of data of other UEs. The configuration information is used to indicate data to be forwarded by the selected UE, that is, the configuration information is used to indicate which data from the base station, received by the selected UE, is to be forwarded to other UEs, or to indicate which data is data transmitted from other UEs and to be forwarded to the base station. This configuration information may be transmitted to the selected UE together with the indication information which is transmitted by the base station to the selected UE in the step 902, or transmitted to the selected UE by an independent step after the step 902.

For each of other UEs for which data is to be forwarded by the selected UE, the configuration information at least includes one of the following information:

1) ID information of other UEs to which the data to be forwarded belongs;

2) indication information of a bearer to which the data to be forwarded belongs, wherein the indication information may be ID information of a bearer, and further, the indication information may indicate that the bearer is a bearer in the control plane or a bearer in the user plane;

3) ID information of a logical channel to which the data to be forwarded belongs, wherein the logical channel to which the data to be forwarded belongs is a logical channel used by the selected UE to receive or transmit the data forwarded by the selected UE; and 4) information on physical resources to which the data to be forwarded belongs, wherein the physical resources to which the data to be forwarded belongs are physical resources used by the selected UE to receive or transmit the data forwarded by the selected UE, for example, time resources, frequency resources, spatial resources, or time-frequency resources.

The following description will be given by several examples.

In a first example, if a UE selected by a base station (UE0) needs to forward data of two other UEs (UE1 and UE2) and the following information is included in the configuration information transmitted to the UE0: ID of a bearer to which data of the UE1 forwarded by the UE0 belongs is 1 and ID of a bearer to which data of the UE2 forwarded by the UE0 belongs is 2, then:

If a bearer, to which data received by the UE0 from the base station belongs, is a bearer 1, the UE0 forwards the data to the UE1;

If a bearer, to which data received by the UE0 from the base station belongs, is a bearer 2, the UE0 forwards the data to the UE2;

If data received by the UE0 from other UEs belongs to the bearer 1, the data belongs to the UE1, and the UE0 needs to forward the data to the base station; and If data received by the UE0 from other UEs belongs to the bearer 2, the data belongs to the UE2, and the UE0 needs to forward the data to the base station.

In a second example, if a UE selected by a base station (UE0) needs to forward data of two other UEs (UE1 and UE2) and the following information is included in the configuration information transmitted to the UE0: data of the UE1, which is forwarded by the UE0, belongs to data received on a logical channel 1, and data of the UE2, which is forwarded by the UE0, belongs to data received on a logical channel 2, then:

If data received by the UE0 from the base station is transmitted by the logical channel 1, the UE0 forwards the data to the UE1;

If data received by the UE0 from the base station is transmitted by the logical channel 2, the UE0 forwards the data to the UE2;

If data received by the UE0 from other UEs is transmitted by the logical channel 1, the data belongs to the UE1, and the UE0 needs to forward the data to the base station; and If data received by the UE0 from other UEs is transmitted by the logical channel 2, the data belongs to the UE2, and the UE0 needs to forward the data to the base station.

In a third example, if a UE selected by a base station (UE0) needs to forward data of two other UEs (UE1 and UE2) and the following information is included in the configuration information transmitted to the UE0: data of the UE, which is forwarded by the UE0, is from a time-frequency resource block 1, and data of the UE2, which is forwarded by the UE0, is from a time-frequency resource block 2, then:

if the UE0 receives, from the time-frequency resource block 1, data from the base station, the UE0 forwards the data to the UE1;

if the UE0 receives, from the time-frequency resource block 2, data from the base station, the UE0 forwards the data to the UE2;

if the UE0 receives, from the time-frequency resource block 1, data from other UEs, the data belongs to the UE1, and the UE0 needs to forward the data to the base station; and if the UE0 receives, from the time-frequency resource block 2, data from other UEs, the data belongs to the UE2, and the UE0 needs to forward the data to the base station.

Upon receiving the configuration information, the selected UE may reply the base station with a configuration response message to confirm the correct reception of the configuration information.

The enUE serves other UEs according to the configured protocol stack. A cell supported by the base station is considered as the first cell, and a cell where enUE serves other UEs is considered as the second cell. The first cell and the second cell may be a same cell or different cells. When they are different cells, they may be different cells at a same frequency or different cells at different frequencies.

The technical solutions of the present disclosure will be further described below in details by several preferred embodiments.

Embodiment 7

This embodiment describes a case where the gNB configures an enUE to enter an enhanced mode B0, i.e., configures an enUE to use a protocol stack structure B0, in order to forward data of other UEs.

Hereinafter, a cell supported by the gNB is referred to as the first cell, and the communication link between a UE and the gNB in the first cell is referred to as the first link. After a UE becomes an enUE, in some enhanced modes in the present disclosure, the enUE will form a new cell which is referred to as the second cell, and a direct communication link between the enUE and other UEs in the second cell is referred to as the second link. The first cell and the second cell may be at a same frequency or different frequencies.

The gNB may select, according to information reported by UEs, a UE that will become an enUE.

The information reported by UEs at least contains: channel state information in the first link. Optionally, it may contain at least one of the following information: UE location information, UE movement speed information, UE wireless capability information, information on interference strength of surrounding radio frequency bands, channel state information on one or more carriers between a UE and other UEs, video/audio information of the surrounding, etc. Wherein, the channel state information on one or more carriers between a UE and other UEs may assist the gNB in selecting a UE to enter an enhanced mode.

The gNB may determine, according to the channel state information in the first link reported by each UE, a channel condition between each UE and the gNB, and determine, according to the channel state information on at least one carrier between each UE and the surrounding other UEs, a channel condition between UEs, so as to select a UE having a good channel condition (better than a first set threshold) to enter an enhanced mode and forward data of a UE having a poor channel condition (worse than a second set threshold) by the UE entering the enhanced mode.

For the selected UE, the gNB may indicate the UE to enter an enhanced mode B1 (i.e., indicate the UE to become an enUE) by using an RRC signaling (for example, RRC RECONFIGURATION) which carries configuration information of a UE-enhanced mode. This configuration information may further include configuration information related to forwarding of data of other UEs. In addition, the configuration information related to forwarding of data of other UEs may be transmitted to the UE by an RRC signaling different from the above RRC signaling.

In the RRC signaling from the gNB, at least one of the following configuration information should be provided: a duplex mode used by the second link (i.e., TDD, FDD, or full duplex), a carrier and a bandwidth used by the second link, a physical cell ID of a cell where the second link is located, a maximum transmission power of the enUE in the second link, and an operating mode of the second link (i.e., stand-alone or non-stand-alone). If the second link operates in the stand-alone mode, then in the RRC signaling from the gNB, information carried by the synchronization channel and broadcast channel for the second link and the transmission method thereof should also be provided.

The UE executes corresponding configuration and enters an enhanced mode, and may reply with an RRC signaling (for example, RRC RECONFIGURATION COMPLETE) to inform the gNB of the successful execution of this operation.

After the UE becomes an enUE, it operates in the enhanced mode B0. Preferably, in this case, the second cell operates in a stand-alone mode, and the enUE transmits a synchronization channel, a broadcast channel or the like necessary for other UEs to access the second cell and receives an access request from other UEs. Other UEs are connected to the enUE by regarding the enUE as the gNB.

Preferably, in this case, the second cell operates in a non-stand-alone mode, and the gNB may provide auxiliary information for a UE in the first cell to access the second cell. The enUE communicates, by using a protocol stack which is used when serving other UEs in the enhanced mode configured by the gNB, with other UEs in the second cell, and communicates, by using its own UE protocol stack, with the gNB in the first cell. The enUE forwards data according to the configuration information of the enhanced mode configured by the gNB. For example, if the following configuration is included in the configuration information: the information on a plane served by a protocol stack used in the UE-enhanced mode includes both the control plane data and the user plane data and the data direction in the plane served by the protocol stack used in the UE-enhanced mode includes the uplink data and the downlink data, then the enUE forwards the uplink control plane data and the uplink user plane data from other UEs to the gNB and also forwards the downlink control plane data and the downlink user plane data from the gNB, which are intended for other UEs, to other UEs.

the information on a plane served by a protocol stack used in the UE-enhanced mode in the configuration information may include only one of the control plane data and the user plane data, or the data direction in the plane served by the protocol stack used in the UE-enhanced mode may include only one of the uplink data and the downlink data. For example, the information on a plane served by a protocol stack used in the UE-enhanced mode includes only the user plane data, and other UEs exchange the control plane data with the gNB in other ways, for example, other UEs are directly connected to the gNB.

Figure 19:
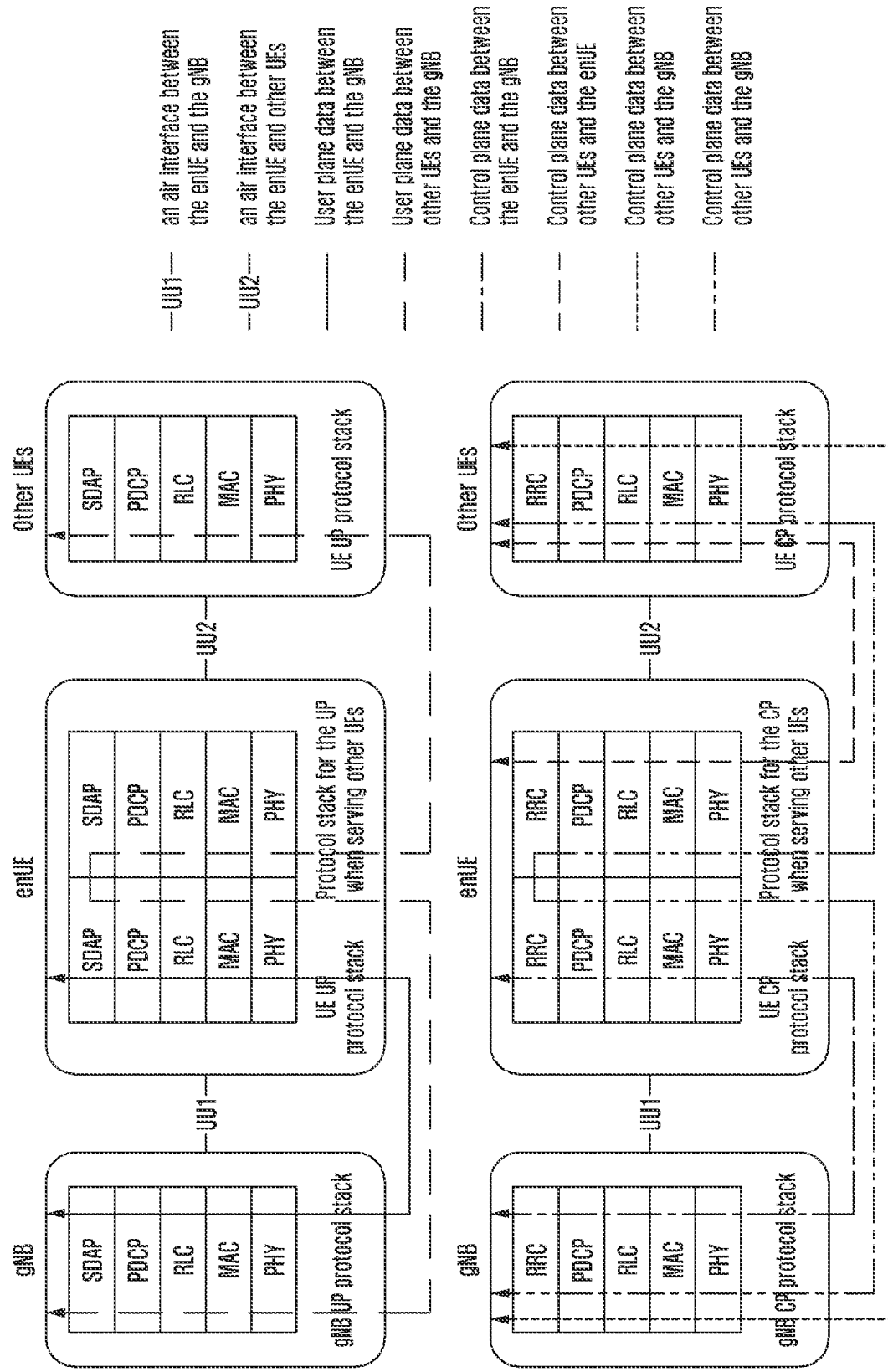
FIG. 19 is a schematic diagram of Embodiment 7 of the present disclosure.

FIG. 19 is a schematic diagram of Embodiment 7 of the present disclosure. A process for processing data in the user plane and a process for processing data in the control plane in this embodiment will be described in detail below with reference to FIG. 19.

1. Processes for processing data in the user plane (1) A process for processing downlink data between the gNB and the enUE includes the following steps.

Step 1: The gNB processes the raw data belonging to the enUE successively by the SDAP, PDCP, RLC, MAC and PHY layers, and then transmits the data to the enUE via an interface UU1. The raw data is data not yet processed by the protocol stack.

Step 2: The enUE processes the data received from the gNB successively by the PHY, MAC, RLC, PDCP and SDAP layers, to obtain the raw data belonging to the enUE.

(2) A process for processing uplink data between the gNB and the enUE includes the following steps.

Step 1: The enUE processes the raw data successively by the SDAP, PDCP, RLC, MAC and PHY layers, and then transmits the data to the gNB via an interface UU1.

Step 2: The gNB processes the data received from the enUE successively by the PHY, MAC, RLC, PDCP and SDAP layers, to obtain the raw data sent by the enUE.

(3) A process for processing downlink data between the gNB and other UEs includes the following steps.

Step 1: The gNB processes raw data belonging to other UEs successively by the SDAP, PDCP, RLC, MAC and PHY layers, and then transmits the data to the enUE via an interface UU1.

Step 2: The enUE processes, according to the received configuration information related to forwarding of data of other UEs, data belonging to other UEs which is received from the gNB successively by the PHY, MAC, RLC, PDCP and SDAP layers, to obtain the data belonging to other UEs.

Step 3: The enUE processes the data belonging to other UEs obtained in the step 2 successively by the SDAP, PDCP, RLC, MAC and PHY layers, and then transmits the data to corresponding other UEs via an interface UU2.

Step 4: The corresponding other UEs process the received data successively by the PHY, MAC, RLC, PDCP and SDAP layers, to obtain the raw data sent to itselves by the gNB.

During this process, raw data belonging to other UEs may not be forwarded to other UEs by the enUE. That is, in the step 1, the gNB processes the raw data belonging to other UEs successively by the SDAP, PDCP, RLC, MAC and PHY layers, and then directly transmits the data to other UEs by an interface UU1 or other interfaces; and then, other UEs obtain the data sent to itselves by the gNB according to the step 4. This is just as the process in the above description: the UE-enhanced mode serves only the control plane data of other UEs, not the user plane data of other UEs; Alternatively, the UE-enhanced mode serves only the uplink transmission direction of other UEs, not the downlink transmission direction of other UEs. The uplink data processing, uplink control signaling processing or downlink control signaling processing between the gNB and other UEs may be implemented in a similar way, and will not be repeated here.

(4) A process for processing uplink data between the gNB and other UEs includes the following steps.

Step 1: Other UEs process raw data sent to the gNB successively by the SDAP, PDCP, RLC, MAC and PHY layers, and then transmit the data to the enUE via an interface UU2.

Step 2: The enUE processes, according to the configuration information related to forwarding of data of other UEs received by the enUE, the received data sent to the gNB by other UEs successively by the PHY, MAC, RLC, PDCP and SDAP layers, to obtain the data sent to the gNB by other UEs.

Step 3: The enUE processes the data sent to the gNB by other UEs obtained in the step 2 successively by the SDAP, PDCP, RLC, MAC and PHY layers, and then transmits the data to the gNB via an interface UU1.

Step 4: The gNB processes the received data successively by the PHY, MAC, RLC, PDCP and SDAP layers, to obtain the raw data sent to the gNB by other UEs.

During this process, the interface UU1 may perform data transmission via a wired link, or perform data transmission via a wireless link. The interface UU2 performs data transmission via a wireless link.

2. Processes for processing data in the control plane (1) A process for processing a downlink control signaling between the gNB and the enUE includes the following steps.

Step 1: The gNB generates a control signaling belonging to the enUE in an RRC layer.

Step 2: The gNB processes the control signaling generated in the step 1, successively by the PDCP, RLC, MAC and PHY layers, and then transmits it to the enUE via an interface UU1.

Step 3: The enUE processes the signaling received from the gNB successively by the PHY, MAC, RLC, PDCP and RRC layers, to obtain the control signaling belonging to the enUE.

(2) A process for processing an uplink control signaling between the gNB and the enUE includes the following steps.

Step 1: The enUE generates a control signaling belonging to the enUE in an RRC layer.

Step 2: The enUE processes the control signaling generated in the step 1 successively by the PDCP, RLC, MAC and PHY layers, and then transmits the control signaling to the gNB via an interface UU1.

Step 3: The gNB processes the signaling received from the enUE successively by the PHY, MAC, RLC, PDCP and RRC layers, to obtain the control signaling sent by the enUE.

(3) A process for processing a downlink control signaling between the gNB and other UEs includes the following steps.

Step 1: The gNB generates a control signaling belonging to other UEs in an RRC layer.

Step 2: The gNB processes the control signaling belonging to other UEs successively by the PDCP, RLC, MAC and PHY layers, and then transmits the control signaling to the enUE via an interface UU1.

Step 3: The enUE processes, according to the configuration information related to forwarding of data of other UEs received by the enUE, the signaling belonging to other UEs which is received from the gNB successively by the PHY, MAC, RLC, PDCP and RRC layers, to obtain the signaling belonging to other UEs.

Step 4: The enUE processes the signaling belonging to other UEs obtained in the step 3 successively by the RRC, PDCP, RLC, MAC and PHY layers, and then transmits the signaling to corresponding other UEs via an interface UU2.

Step 5: The corresponding other UEs process the received signaling successively by the PHY, MAC, RLC, PDCP and RRC layers, to obtain the control signaling sent to the corresponding other UEs by the gNB.

During this process, the control signaling belonging to other UEs may not be forwarded to other UEs by the enUE. That is, in the step 2, the gNB processes the control signaling belonging to other UEs successively by the PDCP, RLC, MAC and PHY layers, and then directly transmits the control signaling to other UEs by an interface UU1 or other interfaces; and then, other UEs obtain the control signaling sent to other UEs by the gNB according to the step 5. This is just as the process in the above description: the UE-enhanced mode serves only the user plane data of other UEs, not the control plane data of other UEs; Alternatively, the UE-enhanced mode serves only the uplink transmission direction of other UEs, not the downlink transmission direction of other UEs. In addition, the control signaling belonging to other UEs may be generated by the enUE (that is, it is not required to generate an RRC signaling for other UEs by the gNB), and then successively processed by the PDCP, RLC, MAC and PHY layers and transmitted to other UEs. Then, the control signaling sent to the UEs may be obtained according to the step 5.

(4) A process for processing an uplink control signaling between the gNB and other UEs includes the following steps.

Step 1: Other UEs generate a control signaling in an RRC layer.

Step 2: Other UEs process the control signaling generated in the step 1 successively by the PDCP, RLC, MAC and PHY layers, and then transmit the control signaling to the gNB via an interface UU2.

Step 3: The enUE processes, according to the configuration information related to forwarding of data of other UEs received by the enUE, the signaling received from other UEs successively by the PHY, MAC, RLC, PDCP and RRC layers, to obtain the signaling belonging to other UEs.

Step 4: The enUE processes the signaling belonging to other UEs obtained in the step 3 successively by the RRC, PDCP, RLC, MAC and PHY layers, and then transmits the signaling to the gNB via an interface UU1.

Step 5: The gNB processes the received data successively by the PHY, MAC, RLC, PDCP and RRC layers, to obtain the control signaling sent by other UEs.

During this process, the control signaling may not be forwarded to the gNB by the enUE. That is, in the step 2, other UEs process the control signaling successively by the PDCP, RLC, MAC and PHY layers, and then directly transmit the control signaling to the gNB via an interface UU1 or other interfaces; and then, the gNB obtains the control signaling sent by other UEs according to the step 5. This is just as the process in the above description: the UE-enhanced mode serves only the user plane data of other UEs, not the control plane data of other UEs; Alternatively, the UE-enhanced mode serves only the downlink transmission direction of other UEs, not the uplink transmission direction of other UEs. In addition, the control signaling sent by other UEs may be obtained in the following way: a control signaling is generated by other UEs, then processed by the PDCP, RLC, MAC and PHY layers and transmitted to the enUE, and then processed by the PHY, MAC, RLC, PDCP and RRC layers on the enUE side. The enUE is not required to transmit an RRC signaling of other UEs to the gNB.

During this process, the interface UU1 may perform data transmission via a wired link, or perform data transmission via a wireless link. The interface UU2 performs data transmission via a wireless link.

Embodiment 8

This embodiment describes a case where the gNB configures an enUE to enter an enhanced mode B0 in order to forward data of other UEs.

In this embodiment, a cell supported by the gNB is referred to as the first cell, and the communication link between a UE and the gNB in the first cell is referred to as the first link. After a UE becomes an enUE, the enUE still serve other UEs in the first cell, and a communication link used by the enUE to serve other UEs is referred to as the second link.

The gNB may select one UE, and indicate the UE to enter an enhanced mode B0 (i.e., indicate the UE to become an enUE) by using an RRC signaling (for example, RRC RECONFIGURATION) which carries configuration information of a UE-enhanced mode. The gNB may select a UE that will become an enUE according to the information reported by UEs. The information reported by UEs may contain at least one of the following information: channel state information in the first link, location information, movement speed information, UE wireless capability information, information on interference strength of surrounding radio frequency bands, channel state information on one or more carriers between a UE and other UEs, video/audio information of the surrounding, etc. In the RRC signaling from the gNB, at least one of the following configuration information should be provided: a duplex mode used by the second link (i.e., TDD, FDD, or full duplex), a carrier and a bandwidth used by the second link, a maximum transmission power of the enUE in the second link, and an operating mode of the second link (i.e., stand-alone or non-stand-alone). The UE executes this operation and may reply with an RRC signaling (for example, RRC RECONFIGURATION COMPLETE) to notify the gNB of the successive execution of this step.

After the UE becomes an enUE, it operates in the enhanced mode B0. Preferably, in this case, the second link operates in a stand-alone mode, and the enUE transmits a synchronization channel, a broadcast channel or the like necessary for other UEs to access the enUE and receives an access request from other UEs. Other UEs are connected to the enUE by regarding the enUE as the gNB. Preferably, in this case, the second link operates in a non-stand-alone mode, and the gNB may provide auxiliary information for other UEs in the first cell to access the enUE. The enUE communicates, by using a protocol stack which is used when serving other UEs in the enhanced mode configured by the gNB, with other UEs in the second link, and communicates, by using its own UE protocol stack, with the gNB in the first link. The enUE forwards data according to the configuration information of the enhanced mode configured by the gNB. For example, if the following configuration is included in the configuration information: the information on a plane served by a protocol stack used by the UE in the enhanced mode includes both control plane data and user plane data and the data direction in the plane by the protocol stack used by the UE in the enhanced mode includes uplink data and downlink data, then the enUE forwards uplink control plane data and uplink user plane data from other UEs to the gNB and also forwards downlink control plane data and downlink user plane data from the gNB, which are intended for other UEs, to other UEs.

The information on a plane served by a protocol stack used in the UE-enhanced mode in the configuration information may include only one of the control plane data and the user plane data, or the data direction in the plane served by the protocol stack used in the UE-enhanced mode may include only one of the uplink data and the downlink data. For example, the information on a plane served by a protocol stack used in the UE-enhanced mode includes only the user plane data, other UEs exchange the control plane data with the gNB in other ways, for example, other UEs are directly connected to the gNB.

This configuration information may further include configuration information related to forwarding of data of other UEs. In addition, the configuration information related to forwarding of data of other UEs may be transmitted to the UE by an RRC signaling different from the above RRC signaling.

Embodiment 9

This embodiment describes a case where the gNB indicates an enUE to enter an enhanced mode B3 in order to forward data of other UEs.

The gNB may select one UE, and indicate the UE to enter an enhanced mode B3 (i.e., indicate the UE to become an enUE) by using an RRC signaling (for example, RRC RECONFIGURATION) which carries configuration information of a UE-enhanced mode. The UE executes this operation and may reply with an RRC signaling (for example, RRC RECONFIGURATION COMPLETE) to notify the gNB of the successive execution of this step. This configuration information may further include configuration information related to forwarding of data of other UEs. In addition, the configuration information related to forwarding of data of other UEs may be transmitted to the UE by an RRC signaling different from the above RRC signaling.

After the UE becomes an enUE, it operates in the enhanced mode B3. If the enUE forms a second cell as described above, preferably, in this case, the second cell operates in a non-stand-alone mode, and the gNB configures the second cell as the secondary cell for part or all of UEs in the first cell, and activates the second cell on the part or all of other UEs if necessary. The gNB may activate the second cell by transmitting an activation signaling. The first cell and the second cell may be at a same frequency or different frequencies. The gNB shall provide context information (for example, a user ID, information carried by user data, information carried by a user signaling) of the part or all of UEs to the enUE. The enUE communicates with other UEs by using a protocol stack which is used to serve other UEs in the enhanced mode configured by the gNB, and communicates with the gNB by using its own UE protocol stack. The enUE forwards data according to the configuration information of the enhanced mode configured by the gNB. For example, if the following configuration is included in the configuration information: the information on a plane served by a protocol stack used by the UE in the enhanced mode includes both control plane data and user plane data and the data direction in the plane by the protocol stack used by the UE in the enhanced mode includes uplink data and downlink data, then the enUE forwards uplink control plane data and uplink user plane data from other UEs to the gNB and also forwards downlink control plane data and downlink user plane data from the gNB, which are intended for other UEs, to other UEs.

The information on a plane served by a protocol stack used in the UE-enhanced mode in the configuration information may include only one of the control plane data and the user plane data, or the data direction in the plane served by the protocol stack used in the UE-enhanced mode may include only one of the uplink data and the downlink data. For example, the information on a plane served by a protocol stack used in the UE-enhanced mode includes only the user plane data, other UEs exchange the control plane data with the gNB in other ways, for example, other UEs are directly connected to the gNB.

Figure 20:
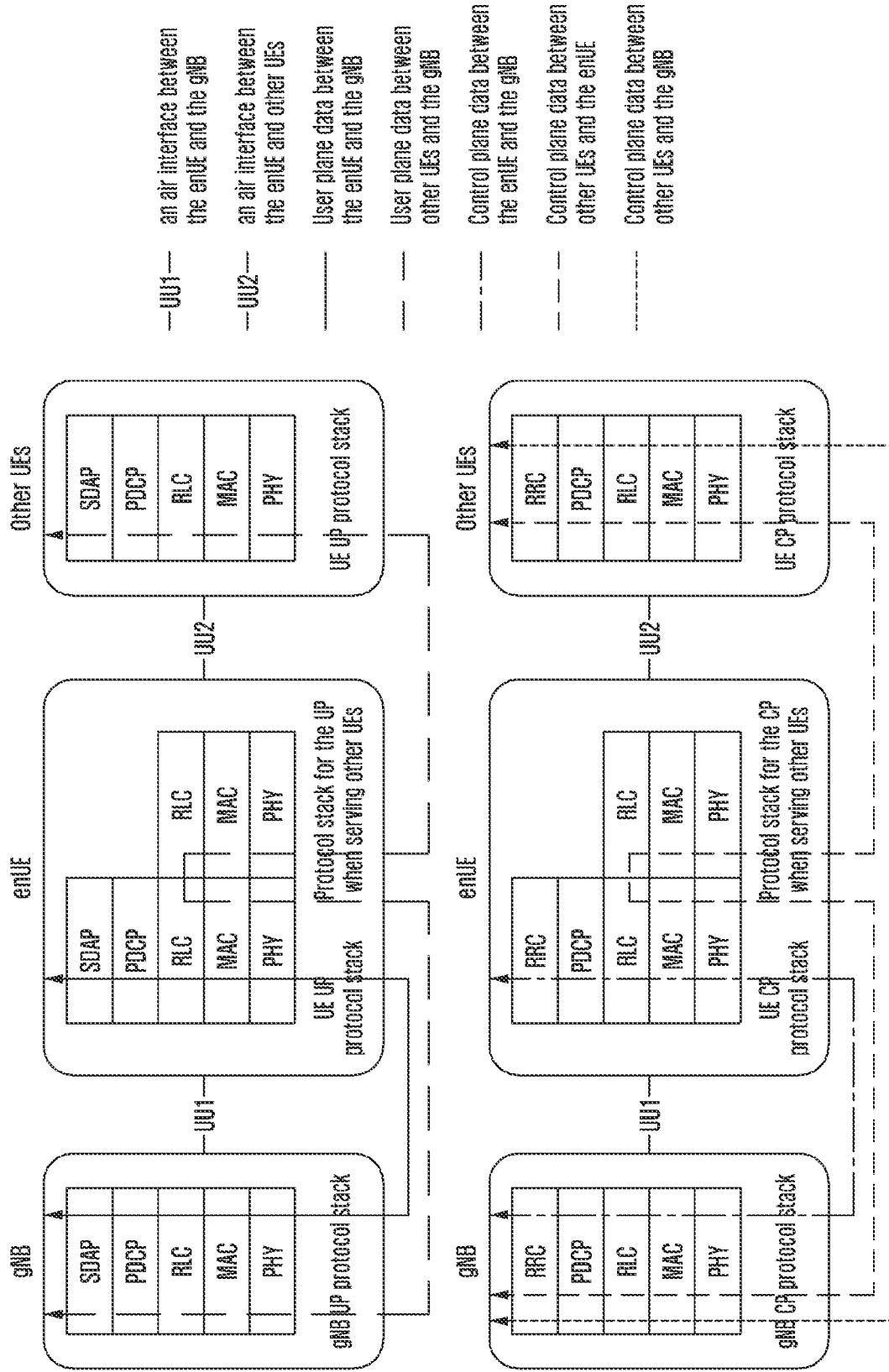
FIG. 20 is a schematic diagram of Embodiment 9 of the present disclosure.

FIG. 20 is a schematic diagram of Embodiment 9 of the present disclosure. A process for processing data in the user plane and a process for processing data in the control plane in this embodiment will be described in detail below with reference to FIG. 20.

1. Processes for processing data in the user plane (1) A process for processing downlink data between the gNB and the enUE includes the following steps.

Step 1: The gNB processes the raw data belonging to the enUE successively by the SDAP, PDCP, RLC, MAC and PHY layers, and then transmits the data to the enUE via an interface UU1.

Step 2: The enUE processes the data received from the gNB successively by the PHY, MAC, RLC, PDCP and SDAP layers, to obtain the raw data belonging to the enUE.

(2) A process for processing uplink data between the gNB and the enUE includes the following steps.

Step 1: The enUE processes the raw data successively by the SDAP, PDCP, RLC, MAC and PHY layers, and then transmits the data to the gNB via an interface UU1.

Step 2: The gNB processes the data received from the enUE successively by the PHY, MAC, RLC, PDCP and SDAP layers, to obtain the raw data sent by the enUE.

(3) A process for processing downlink data between the gNB and other UEs includes the following steps.

Step 1: The gNB processes raw data belonging to other UEs successively by the SDAP, PDCP, RLC, MAC and PHY layers, and then transmits the data to the enUE via an interface UU1.

Step 2: The enUE processes, according to the configuration information related to forwarding of data of other UEs received by the enUE, data belonging to other UEs which is received from the gNB successively by the PHY, MAC and RLC layers, to obtain the data belonging to other UEs.

Step 3: The enUE processes the data belonging to other UEs obtained in the step 2 successively by the RLC, MAC and PHY layers, and then transmits the data to corresponding other UEs via an interface UU2.

Step 4: The corresponding other UEs process the received data successively by the PHY, MAC, RLC, PDCP and SDAP layers, to obtain the raw data sent to the corresponding other UEs by the gNB.

(4) A process for processing uplink data between the gNB and other UEs includes the following steps.

Step 1: Other UEs process raw data sent to the gNB successively by the SDAP, PDCP, RLC, MAC and PHY layers, and then transmit the data to the enUE via an interface UU2.

Step 2: The enUE processes, according to the configuration information related to forwarding of data of other UEs received by the enUE, the received data sent to the gNB by other UEs successively by the PHY, MAC and RLC layers, to obtain the data sent to the gNB by other UEs.

Step 3: The enUE processes the data sent to the gNB by other UEs obtained in the step 2 successively by the RLC, MAC and PHY layers, and then transmits the data to the gNB via an interface UU1.

Step 4: The gNB processes the received data successively by the PHY, MAC, RLC, PDCP and SDAP layers, to obtain the raw data sent to the gNB by other UEs.

During this process, the interface UU1 may perform data transmission via a wired link, or perform data transmission via a wireless link. The interface UU2 performs data transmission via a wireless link.

2. Processes for processing data in the control plane (1) A process for processing a downlink control signaling between the gNB and the enUE includes the following steps.

Step 1: The gNB generates a control signaling belonging to the enUE in an RRC layer.

Step 2: The gNB processes the control signaling belonging to the enUE, which is generated in the step 1, successively by the PDCP, RLC, MAC and PHY layers, and then transmits the control signaling to the enUE via an interface UU1.

Step 3: The enUE processes the signaling received from the gNB successively by the PHY, MAC, RLC, PDCP and RRC layers, to obtain the control signaling belonging to the enUE.

(2) A process for processing an uplink control signaling between the gNB and the enUE includes the following steps.

Step 1: The enUE generates a control signaling belonging to the enUE in an RRC layer.

Step 2: The enUE processes the control signaling generated in the step 1 successively by the PDCP, RLC, MAC and PHY layers, and then transmits the control signaling to the gNB via an interface UU1.

Step 3: The gNB processes the signaling received from the enUE successively by the PHY, MAC, RLC, PDCP and RRC layers, to obtain the control signaling sent by the enUE.

(3) A process for processing a downlink control signaling between the gNB and other UEs includes the following steps.

Step 1: The gNB generates a control signaling belonging to other UEs in an RRC layer.

Step 2: The gNB processes the control signaling belonging to other UEs successively by the PDCP, RLC, MAC and PHY layers, and then transmits the control signaling to the enUE via an interface UU1.

Step 3: The enUE processes, according to the configuration information related to forwarding of data of other UEs received by the enUE, the signaling belonging to other UEs which is received from the gNB successively by the PHY, MAC and RLC layers, to obtain the data belonging to other UEs.

Step 4: The enUE processes the signaling belonging to other UEs obtained in the step 3 successively by the RLC, MAC and PHY layers, and then transmits the signaling to corresponding other UEs via an interface UU2.

Step 5: The corresponding other UEs process the received data successively by the PHY, MAC, RLC, PDCP and RRC layers, to obtain the control signaling sent to the corresponding other UEs by the gNB.

During this process, the control signaling belonging to other UEs may not be forwarded to other UEs by the enUE. That is, in the step 2, the gNB processes the control signaling belonging to other UEs successively by the PDCP, RLC, MAC and PHY layers, and then directly transmits the control signaling to other UEs by an interface UU1 or other interfaces; and then, other UEs obtain the control signaling sent to other UEs by the gNB according to the step 5. This is just as the process in the above description: the UE-enhanced mode serves only the user plane data of other UEs, not the control plane data of other UEs; Alternatively, the UE-enhanced mode serves only the uplink transmission direction of other UEs, not the downlink transmission direction of other UEs.

(4) A process for processing an uplink control signaling between the gNB and other UEs includes the following steps.

Step 1: Other UEs generate a control signaling in an RRC layer.

Step 2: Other UEs process the control signaling in the step 1 successively by the PDCP, RLC, MAC and PHY layers, and then transmit the control signaling to the gNB via an interface UU2.

Step 3: The enUE processes, according to the configuration information related to forwarding of data of other UEs received by the enUE, the signaling received from other UEs successively by the PHY, MAC and RLC layers, to obtain the data belonging to other UEs.

Step 4: The enUE processes the data belonging to other UEs obtained in the step 3 successively by the RLC, MAC and PHY layers, and then transmits the data to the gNB via an interface UU1.

Step 5: The gNB processes the received data successively by the PHY, MAC, RLC, PDCP and RRC layers, to obtain the control signaling sent by other UEs.

During this process, the control signaling may not be forwarded to the gNB by the enUE. That is, in the step 2, other UEs process the control signaling successively by the PDCP, RLC, MAC and PHY layers, and then directly transmit the control signaling to the gNB via an interface UU1 or other interfaces; and then, the gNB obtains the control signaling sent by other UEs according to the step 5. This is just as the process in the above description: the UE-enhanced mode serves only the user plane data of other UEs, not the control plane data of other UEs; Alternatively, the UE-enhanced mode serves only the downlink transmission direction of other UEs, not the uplink transmission direction of other UEs.

During this process, the interface UU1 may perform data transmission via a wired link, or perform data transmission via a wireless link. The interface UU2 performs data transmission via a wireless link.

Embodiment 10

This embodiment describes a case where the gNB indicates an enUE to enter an enhanced mode B6 in order to forward data of other UEs.

The gNB may select one UE, and indicate the UE to enter an enhanced mode B6 (i.e., indicate the UE to become an enUE) by using an RRC signaling (for example, RRC RECONFIGURATION) which carries configuration information of a UE-enhanced mode. The UE executes this operation and may reply with an RRC signaling (for example, RRC RECONFIGURATION COMPLETE) to notify the gNB of the successive execution of this step. This configuration information may further include configuration information related to forwarding of data of other UEs. In addition, the configuration information related to forwarding of data of other UEs may be transmitted to the UE by an RRC signaling different from the above RRC signaling.

After the UE becomes an enUE, the communicates with other UEs by using a protocol stack which is used when serving other UEs in the enhanced mode configured by the gNB, and communicates with the gNB by using its own UE protocol stack. The enUE forwards data according to the configuration information of the enhanced mode configured by the gNB. For example, if the following configuration is included in the configuration information: the information on a plane served by a protocol stack used by the UE in the enhanced mode includes both control plane data and user plane data and the data direction in the plane by the protocol stack used by the UE in the enhanced mode includes uplink data and downlink data, then the enUE forwards uplink control plane data and uplink user plane data from other UEs to the gNB and also forwards downlink control plane data and downlink user plane data from the gNB, which are intended for other UEs, to other UEs.

The information on a plane served by a protocol stack used in the UE-enhanced mode in the configuration information may include only one of the control plane data and the user plane data, or the data direction in the plane served by the protocol stack used in the UE-enhanced mode may include only one of the uplink data and the downlink data. For example, the information on a plane served by a protocol stack used in the UE-enhanced mode includes only the user plane data, and other UEs exchange the control plane data with the gNB in other ways, for example, other UEs are directly connected to the gNB.

Figure 21:
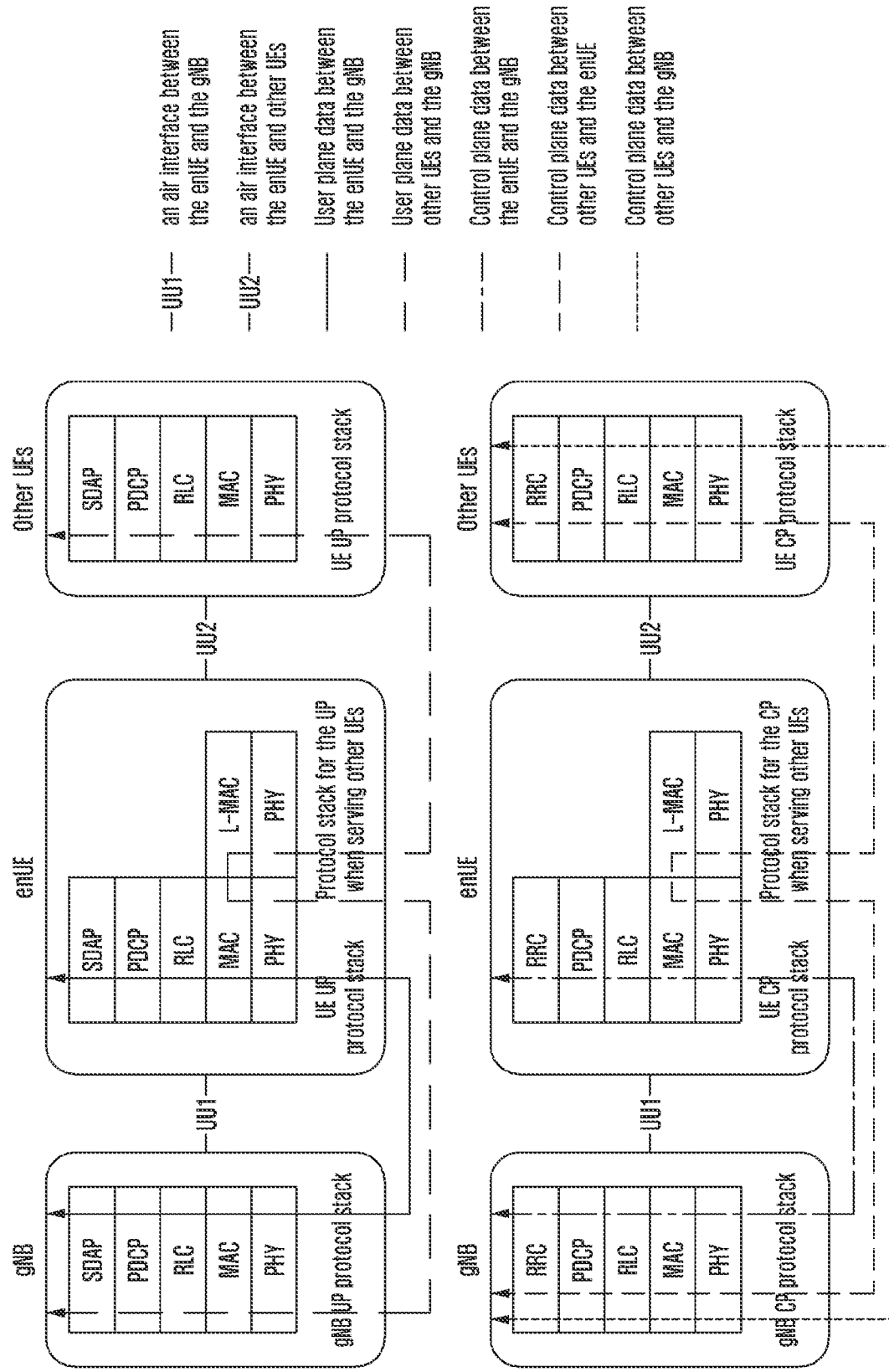
FIG. 21 is a schematic diagram of Embodiment 10 of the present disclosure.

FIG. 21 is a schematic diagram of Embodiment 10 of the present disclosure.

1. Processes for processing data in the user plane (1) A process for processing downlink data between the gNB and the enUE includes the following steps.

Step 1: The gNB processes the raw data belonging to the enUE successively by the SDAP, PDCP, RLC, MAC and PHY layers, and then transmits the data to the enUE via an interface UU1.

Step 2: The enUE processes the data received from the gNB successively by the PHY, MAC, RLC, PDCP and SDAP layers, to obtain the raw data belonging to the enUE.

(2) A process for processing uplink data between the gNB and the enUE includes the following steps.

Step 1: The enUE processes the raw data successively by the SDAP, PDCP, RLC, MAC and PHY layers, and then transmits the data to the gNB via an interface UU1.

Step 2: The gNB processes the data received from the enUE successively by the PHY, MAC, RLC, PDCP and SDAP layers, to obtain the raw data sent by the enUE.

(3) A process for processing downlink data between the gNB and other UEs includes the following steps.

Step 1: The gNB processes raw data belonging to other UEs successively by the SDAP, PDCP, RLC, MAC and PHY layers, and then transmits the data to the enUE via an interface UU1.

Step 2: The enUE processes, according to the configuration information related to forwarding of data of other UEs received by the enUE, data belonging to other UEs which is received from the gNB successively by the PHY layer and part of the MAC layer (L-MAC), to obtain the data belonging to other UEs. Among others, the L-MAC in one embodiment includes a function having a high time delay requirement, for example, HARQ.

Step 3: The enUE processes the data belonging to other UEs obtained in the step 2 successively by part of the MAC layer (L-MAC) and the PHY layer, and then transmits the data to corresponding other UEs via an interface UU2. Among others, the L-MAC in one embodiment includes a function having a high time delay requirement, for example, HARQ.

Step 4: The corresponding other UEs process the received data successively by the PHY, MAC, RLC, PDCP and SDAP layers, to obtain the raw data sent to other UEs by the gNB.

(4) A process for processing uplink data between the gNB and other UEs includes the following steps.

Step 1: Other UEs process raw data sent to the gNB successively by the SDAP, PDCP, RLC, MAC and PHY layers, and then transmit the data to the enUE via an interface UU2.

Step 2: The enUE processes, according to the configuration information related to forwarding of data of other UEs received by the enUE, the received data sent to the gNB by other UEs successively by the PHY layer and part of the MAC layer (L-MAC), to obtain the data sent to the gNB by other UEs. Among others, the L-MAC in one embodiment includes a function having a high time delay requirement, for example, HARQ.

Step 3: The enUE processes the data sent to the gNB by other UEs obtained in the step 2 successively by part of the MAC layer (L-MAC) and the PHY layer, and then transmits the data to the gNB via an interface UU1. Among others, the L-MAC in one embodiment includes a function having a high time delay requirement, for example, HARQ.

Step 4: The gNB processes the received data successively by the PHY, MAC, RLC, PDCP and SDAP layers, to obtain the raw data sent to the gNB by UEs.

During this process, the interface UU1 may perform data transmission via a wired link, or perform data transmission via a wireless link. The interface UU2 performs data transmission via a wireless link.

2. Processes for processing data in the control plane (1) A process for processing a downlink control signaling between the gNB and the enUE includes the following steps.

Step 1: The gNB generates a control signaling belonging to the enUE in an RRC layer.

Step 2: The gNB processes the control signaling belonging to the enUE, which is generated in the step 1, successively by the PDCP, RLC, MAC and PHY layers, and then transmits the control signaling to the enUE via an interface UU1.

Step 3: The enUE processes the signaling received from the gNB successively by the PHY, MAC, RLC, PDCP and RRC layers, to obtain the control signaling belonging to the enUE.

(2) A process for processing an uplink control signaling between the gNB and the enUE includes the following steps.

Step 1: The enUE generates a control signaling belonging to the enUE in an RRC layer.

Step 2: The enUE processes the control signaling generated in the step 1 successively by the PDCP, RLC, MAC and PHY layers, and then transmits the control signaling to the gNB via an interface UU1.

Step 3: The gNB processes the signaling received from the enUE successively by the PHY, MAC, RLC, PDCP and RRC layers, to obtain the control signaling sent by the enUE.

(3) A process for processing a downlink control signaling between the gNB and other UEs includes the following steps.

Step 1: The gNB generates a control signaling belonging to other UEs in an RRC layer.

Step 2: The gNB processes the control signaling belonging to other UEs successively by the PDCP, RLC, MAC and PHY layers, and then transmits the control signaling to the enUE via an interface UU1.

Step 3: The enUE processes, according to the configuration information related to forwarding of data of other UEs received by the enUE, the signaling belonging to other UEs which is received from the gNB successively by the PHY layer and part of the MAC layer (L-MAC), to obtain the data belonging to other UEs. Among others, the L-MAC in one embodiment includes a function having a high time delay requirement, for example, HARQ.

Step 4: The enUE processes the signaling belonging to other UEs obtained in the step 3 successively by part of the MAC layer (L-MAC) and the PHY layer, and then transmits the signaling to corresponding other UEs via an interface UU2. Among others, the L-MAC in one embodiment includes a function having a high time delay requirement, for example, HARQ.

Step 5: The corresponding other UEs process the received signaling successively by the PHY, MAC, RLC, PDCP and RRC layers, to obtain the control signaling sent to the corresponding other UEs by the gNB.

During this process, the control signaling belonging to other UEs may not be forwarded to other UEs by the enUE. That is, in the step 2, the gNB processes the control signaling belonging to other UEs successively by the PDCP, RLC, MAC and PHY layers, and then directly transmits the control signaling to other UEs by an interface UU1 or other interfaces; and then, other UEs obtain the control signaling sent to other UEs by the gNB according to the step 5. This is just as the process in the above description: the UE-enhanced mode serves only the user plane data of other UEs, not the control plane data of other UEs; Alternatively, the UE-enhanced mode serves only the uplink transmission direction of other UEs, not the downlink transmission direction of other UEs.

(4) A process for processing an uplink control signaling between the gNB and other UEs includes the following steps.

Step 1: Other UEs generate a control signaling in an RRC layer.

Step 2: Other UEs process the control signaling in the step 1 successively by the PDCP, RLC, MAC and PHY layers, and then transmit the control signaling to the gNB via an interface UU2.

Step 3: The enUE processes, according to the configuration information related to forwarding of data of other UEs received by the enUE, the signaling received from other UEs successively by the PHY layer and part of the MAC layer (L-MAC), to obtain the signaling belonging to other UEs.

Step 4: The enUE processes the signaling belonging to other UEs obtained in the step 3 successively by part of the MAC layer (L-MAC) and the PHY layer, and then transmits the signaling to the gNB via an interface UU1.

Step 5: The gNB processes the received signaling successively by the PHY, MAC, RLC, PDCP and RRC layers, to obtain the control signaling sent by other UEs.

During this process, the control signaling may not be forwarded to the gNB by the enUE. That is, in the step 2, other UEs process the control signaling successively by the PDCP, RLC, MAC and PHY layers, and then directly transmit the control signaling to the gNB via an interface UU1 or other interfaces; and then, the gNB obtains the control signaling sent by other UEs according to the step 5. This is just as the process in the above description: the UE-enhanced mode serves only the user plane data of other UEs, not the control plane data of other UEs; Alternatively, the UE-enhanced mode serves only the downlink transmission direction of other UEs, not the uplink transmission direction of other UEs.

During this process, the interface UU1 may perform data transmission via a wired link, or perform data transmission via a wireless link. The interface UU2 performs data transmission via a wireless link.

The above embodiments 1 to 4 describe data transmission in the user plane and the control plane respectively in cases where the enUE configures protocol stack structures B0, B3 and B6. For a case where the enUE configures other protocol stack structures, the data transmission method is similar, which will not be repeated here, except that the protocol stack structure used for processing data of other UEs needs to be processed according to the protocol stack structure used when serving other UEs in the enhanced mode configured by the gNB.

Embodiment 11

Figure 22:
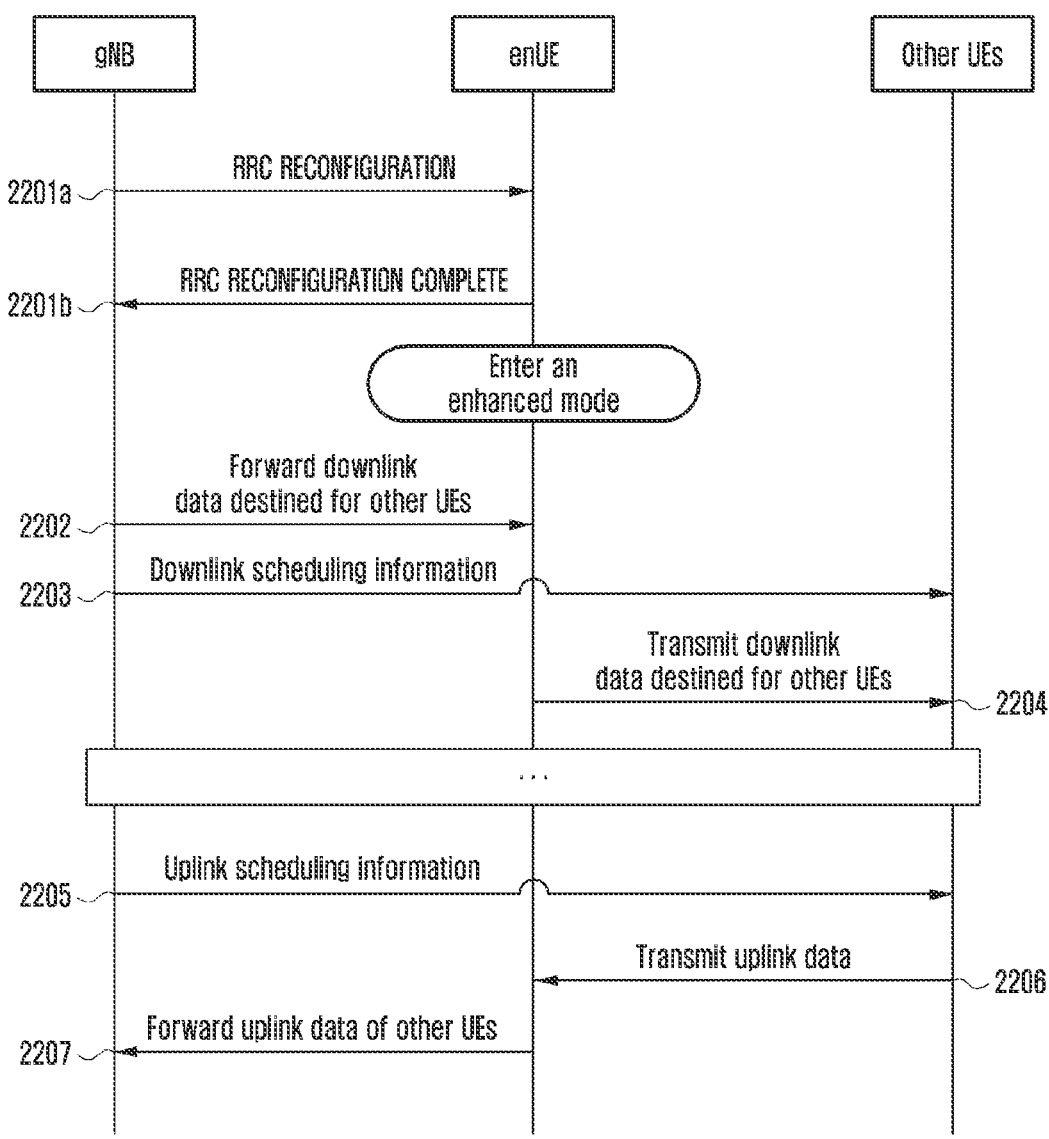
FIG. 22 is a schematic diagram of Embodiment 11 of the present disclosure.

This embodiment describes a case where the gNB indicates an enUE to enter an enhanced mode B6 and acquire scheduling information of the gNB in order to forward data of other UEs. FIG. 22 is a schematic diagram of Embodiment 11 of the present disclosure, including the following steps.

Step 2201: The gNB selects one UE, and transmits configuration information that indicates the UE to enter an enhanced mode (i.e., indicates the UE to become an enUE) by using an RRC signaling (for example, RRC RECONFIGURATION). This configuration information may further include configuration information related to forwarding of data of other UEs. In addition, the configuration information related to forwarding of data of other UEs may be transmitted to the UE by an RRC signaling different from the above RRC signaling. The UE executes this operation and replies with an RRC signaling (for example, RRC RECONFIGURATION COMPLETE) to notify the gNB of the successive execution of this step.

For downlink transmission:

Step 2202: The frequency information used by the first link (in this embodiment, the definition of the first link and the second link is the same as that in Embodiment 7) is called a frequency band 1, and the gNB transmits, to the enUE, user plane data intended for other UEs on the frequency band 1.

Step 2203: The frequency information used between the gNB and other UEs is called a frequency band 2, and the gNB transmits the scheduling information to other UEs on the frequency band 2. Meanwhile, the enUE acquires the scheduling information from the gNB. Time-frequency resources that may be used for transmitting the user plane data are specified in the scheduling information.

Step 2204: The frequency information used by the second link is called a frequency band 3, and the frequency band 3 and the frequency band 2 may be at a same frequency or different frequencies. The enUE transmits the downlink data to other UEs on the frequency band 3 according to the scheduling information from the gNB.

For uplink transmission:

Step 2205: The gNB transmits the scheduling information to other UEs on the frequency band 2. Meanwhile, the enUE acquires the scheduling information from the gNB. Time-frequency resources that may be used for transmitting the user plane data are specified in the scheduling information.

Step 2206: The enUE receives the uplink data from other UEs on the frequency band 3 according to the scheduling information from the gNB. The frequency band 3 and the frequency band 2 may be at a same frequency or different frequencies.

Step 2207: The enUE forwards, on the frequency band 1, the uplink data from other UEs to the gNB.

Correspondingly to the method, the present disclosure further provides a data forwarding UE, including:

a mode switching module configured to enter an enhanced mode according to an indication received from a base station; and a data forwarding module configured to forward data between a base station and a second UE.

According to one embodiment of the present invention, the equipment may further include a module configured to receive, from the base station, scheduling information on time-frequency resources of the second UE.

In this case, the data forwarding module is configured to forward data between the base station and the second UE in the following way: receiving downlink data sent to a second UE from a base station, processing the downlink data layer by layer by a protocol stack structure corresponding to the equipment in the enhanced mode, and forwarding, to the corresponding second UE, the downlink data on the corresponding time-frequency resources according to the scheduling information on the time-frequency resources of the second UE; and/or receiving uplink data sent to a base station from a second UE on corresponding time-frequency resources according to the scheduling information on the time-frequency resources of the second UE, processing the uplink data layer by layer by a protocol stack structure corresponding to the equipment in the enhanced mode, and forwarding the uplink data to the base station.

According to another embodiment of the present invention, the equipment may further include a module configured to transmit, to the second UE, the scheduling information on the time-frequency resources.

In this case, the data forwarding module is configured to forward data between the base station and the second UE in the following way: receiving downlink data sent to a second UE from a base station, processing the downlink data layer by layer by a protocol stack structure corresponding to the equipment in the enhanced mode, and forwarding, to the corresponding second UE, the downlink data on the corresponding time-frequency resources according to the scheduling information; and/or receiving uplink data sent to a base station from a second UE on corresponding time-frequency resources according to the scheduling information, processing the uplink data layer by layer by a protocol stack structure corresponding to the equipment in the enhanced mode, and forwarding the uplink data to the base station.

Preferably, the equipment may further include: a module configured to receive access information and cell configuration information from the base station, the access information is used by a second UE to access the UE; and a module configured to transmit the access information and the cell configuration information to the second UE and accept an access request from the second UE.

Preferably, the equipment may further include a module configured to report channel state information of a first link to the base station, the first link being a link between the UE and the base station. The channel state information is used by the base station to select a first UE having a channel condition better than a first set threshold to enter the enhanced mode in order to forward data between a second UE having a channel condition worse than a second set threshold and the base station.

Preferably, the equipment may further include a module configured to report, to the base station, channel state information on at least one carriers between the UE and the second UE on at least one carrier.

Preferably, the equipment further includes a report module configured to report, to the base station, a protocol stack structure information supported by the UE in the enhanced mode. The protocol stack structure supported by the equipment in the enhanced mode at least includes one of the following structures:

protocol stack structure B0, including: a Radio Resource Control (RRC) layer, a Packet Data Convergence Protocol (PDCP) layer, a Radio Link Control (RLC) layer, a Media Access Control (MAC) layer and a physical (PHY) layer in the control plane, and a Service Data Adaptation Protocol (SDAP) layer, a PDCP layer, an RLC layer, an MAC layer and a PHY layer in the user plane;

protocol stack structure B1, including: a PDCP layer, an RLC layer, an MAC layer and a PHY layer;

protocol stack structure B2, including: part of a PDCP layer, an RLC layer, an MAC layer and a PHY layer;

protocol stack structure B3, including: an RLC layer, an MAC layer and a PHY layer;

protocol stack structure B4, including: part of an RLC layer, an MAC layer and a PHY layer;

protocol stack structure B5, including: an MAC layer and a PHY layer;

protocol stack structure B6, including: part of an MAC layer and a PHY layer;

protocol stack structure B7, including: a PHY layer; and protocol stack structure B8, including: part of a PHY layer.

Preferably, the indication from the base station includes at least one of the following information:

a. a protocol stack structure information used by a first UE in an enhanced mode;

b. information on a plane that the protocol stack structure information serves;

c. a data transmission direction information of a plane that the protocol stack structure information serves; and d. ID information of a second UE that the first UE serves.

Preferably, information on the indication from the base station may include following combinations:

only a configured;

only a set of a and b configured, or at least two different sets of a and b configured;

only a set of a and c configured, or at least two different sets of a and c configured;

only a set of a and d configured, or at least two different sets of a and d configured;

only a set of a, b and c configured, or at least two different sets of a, b and c configured;

only a set of a, b and d configured, or at least two different sets of a, b and d configured;

only a set of a, c and d configured, or at least two different sets of a, c and d configured; and only a set of a, b, c and d configured, or at least two different sets of a, b, c and d configured.

Preferably, the indication from the base station includes at least one of the following information: a duplex mode used by a second link, a carrier and a bandwidth used by a second link, a physical cell ID of a cell where a second link is located, a maximum transmission power of a first UE in the enhanced mode in a second link, and an operating mode of a second link; and Among them, the second link is a link between a first UE in the enhanced mode and a second UE.

Preferably, before forwarding, by the UE, data between the base station and a second UE, the UE further receives, from a base station, configuration information related to forwarding of data of a second UE, the configuration information being used to indicate data to be forwarded.

The configuration information related to forwarding of data of a second UE at least includes one of the following information:

ID information of a second UE to which the data to be forwarded belongs;

indication information of a bearer to which the data to be forwarded belongs;

ID information of a logical channel to which the data to be forwarded belongs; and information on physical resources to which the data to be forwarded belongs.

Correspondingly to the method on the UE side, the present disclosure further provides a data forwarding method on the base station side, including:

transmitting, to a first UE having the capability of supporting an enhanced mode, an indication to enter the enhanced mode; and forwarding data with a second UE by the first UE.

Preferably, the method may further include: transmitting, to the first UE, scheduling information on time-frequency resources of the second UE scheduled by a base station.

Preferably, the method may further include: transmitting, to the first UE, cell configuration information and access information used by a second UE to access the first UE; or transmitting, to a second UE, access information used by the second UE to access the first UE.

Preferably, the method may further include: receiving channel state information of a first link reported by the first UE. Preferably, the transmitting, to a first UE having the capability of supporting an enhanced mode, an indication to enter the enhanced mode includes: selecting, according to channel state information of a first link reported by each UE, a first UE having a channel condition better than a first set threshold, and transmitting, to the first UE having the channel condition better than the first set threshold, an indication to enter an enhanced mode in order to forward data between a second UE having a channel condition worse than a second set threshold and a base station.

Preferably, the indication from the base station includes at least one of the following information:

a. a protocol stack structure information used by a first UE in an enhanced mode;

b. information on a plane that the protocol stack structure information serves;

c. a data transmission direction information of a plane that the protocol stack structure information serves; and d. ID information of a second UE that the first UE serves.

Preferably, the method may further include: transmitting, by a base station and to a first UE, configuration information related to forwarding of data of a second UE, the configuration information being used to indicate data to be forwarded.

Preferably, the configuration information related to forwarding of data of a second UE at least includes one of the following information:

ID information of a second UE to which the data to be forwarded belongs;

indication information of a bearer to which the data to be forwarded belongs;

ID information of a logical channel to which the data to be forwarded belongs; and information on physical resources to which the data to be forwarded belongs.

Correspondingly to the method on the access node side, the present disclosure further provides a base station, including:

an indicating module configured to transmit, to a first UE having the capability of supporting an enhanced mode, an indication to enter the enhanced mode; and a forward processing module configured to forward data of a second UE by the first UE.

Preferably, the method may further include: transmitting, to the first UE, scheduling information on time-frequency resources of the second UE scheduled by a base station.

Preferably, the equipment may further include: a module configured to transmit, to the first UE, cell configuration information and access information used by a second UE to access the first UE; or a module configured to transmit, to a second UE, access information used by the second UE to access the first UE.

Preferably, the equipment may further include a module configured to receive channel state information of a first link reported by the first UE. Preferably, the transmitting, to a first UE having the capability of supporting an enhanced mode, an indication to enter the enhanced mode includes: selecting, according to channel state information of a first link reported by each UE, a first UE having a channel condition better than a first set threshold, and transmitting, to the first UE having the channel condition better than the first set threshold, an indication to enter an enhanced mode in order to forward data between a second UE having a channel condition worse than a second set threshold and a base station.

Preferably, the indication from the base station includes at least one of the following information:

a. a protocol stack structure information used by a first UE in an enhanced mode;

b. information on a plane that the protocol stack structure information serves;

c. a data transmission direction information of a plane that the protocol stack structure information serves; and d. ID information of a second UE that the first UE serves.

Preferably, the base station may also transmit, to a first UE, configuration information related to forwarding of data of a second UE, the configuration information being used to indicate data to be forwarded.

The configuration information related to forwarding of data of a second UE at least includes one of the following information:

ID information of a second UE to which the data to be forwarded belongs;

indication information of a bearer to which the data to be forwarded belongs;
ID information of a logical channel to which the data to be forwarded belongs; and
information on physical resources to which the data to be forwarded belongs.

Figure 23:
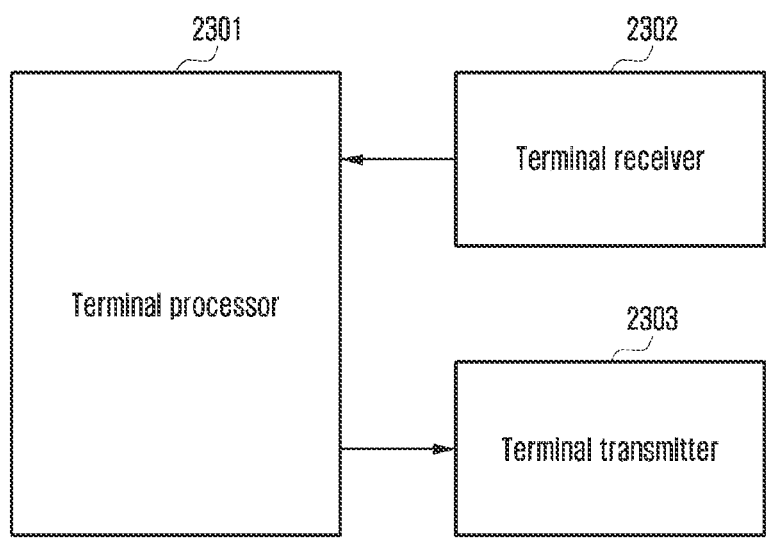
FIG. 23 is a illustrates a block diagram of a structure of a terminal according to embodiments of the present disclosure.

FIG. 23 illustrates a block diagram detailing an internal structure of a terminal according to an embodiment of the present disclosure. As illustrated in FIG. 23, the terminal of the present disclosure may include a terminal processor 2301, a receiver 2302, and a transmitter 2303.

The terminal processor 2301 may control a process to operate the terminal according to embodiments of the present disclosure as described above. For example, the terminal operation can be controlled differently according to different numerologies according to embodiments of the present disclosure.

The terminal receiver 2302 and the terminal transmitter 2303 may be collectively referred to as a transceiver. The transceiver may transmit/receive a signal to/from the base station and/or other terminals. To this end, the transceiver may include an RF transmitter that up-converts and amplifies a frequency of the transmitted signal, an RF receiver that low-noise-amplifies the received signal and down-converts the frequency, or the like. Further, the transceiver may receive a signal through a radio channel and output the received signal to the terminal processor 2301 and transmit the signal output from the terminal processor 2301 through the radio channel.

Figure 24:
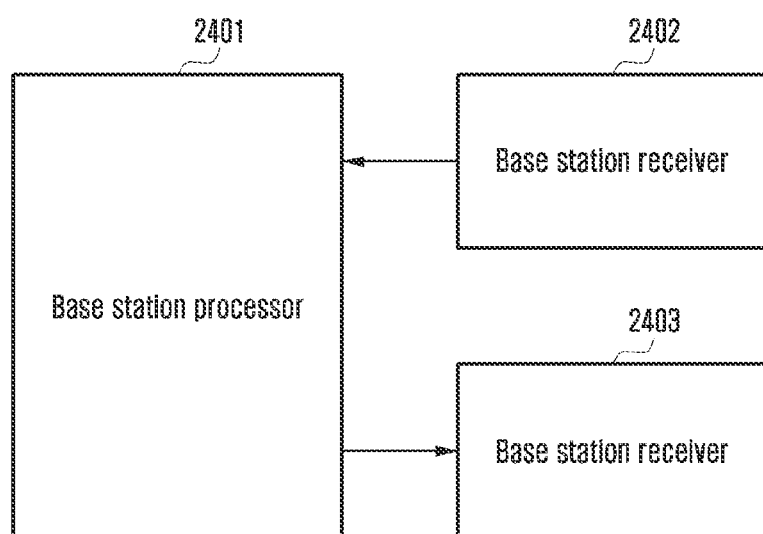
FIG. 24 illustrates a block diagram of a structure of a base station according to embodiments of the present disclosure.

FIG. 24 illustrates a block diagram of an internal structure of the base station according to embodiments of the present disclosure. As illustrated in FIG. 24, the base station of the present disclosure may include a base station processor 2401, a receiver 2402, and a transmitter 2403. The structure of the base station illustrated in FIG. 24 may be applied to above described CU and/or DU.

The base station processor 2401 may control a process to operate the base station according to some embodiments of the present disclosure as described herein. For example, the base station operation can be controlled differently according to different numerologies.

The base station receiver 2402 and the base station transmitter 2403 are collectively referred to as a transceiver. The transceiver may transmit/receive a signal to/from the terminal. To this end, the transceiver may include an RF transmitter that up-converts and amplifies a frequency of the transmitted signal, an RF receiver that low-noise-amplifies the received signal and down-converts the frequency, or the like. Further, the transceiver may receive a signal through a radio channel and output the received signal to the base station processor 2401 and transmit the signal output from the base station processor 2401 through the radio channel.

What is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

What is claimed:

1. A method performed by a central unit (CU) of a gNode B (gNB) including the CU and at least one distributed unit (DU), the method comprising:
receiving, from a DU of the gNB, a first message for setting up an F1 interface, the first message including an identity on the DU and serving cell information on the DU;
storing data included in the first message; and
transmitting, to the DU of the gNB, a second message as a response to the first message, the second message including information on at least one cell in the DU, the at least one cell in the DU being identified based on the serving cell on the DU,
wherein the serving cell information includes a global cell identity, a physical cell identity, a public land mobile network (PLMN) identity, cell frequency information and cell bandwidth information, and
wherein the information on the at least one cell includes the global cell identity.

2. The method of claim 1, wherein the information on the at least one cell further includes at least one of the physical cell identity, master information, or a system information block for the at least one cell.

3. The method of claim 1, wherein the first message further includes capability information on the DU, and
wherein the serving cell information further includes a tracking area code.

4. The method of claim 1, wherein the information on the at least one cell included in the second message indicates an establishment of the at least one cell in the DU.

5. The method of claim 1, wherein the at least one cell is to be activated based on the second message.

6. The method of claim 1, further comprising:
receiving, from the DU of the gNB, an initial transfer message through the F1 interface, the initial transfer message including a radio resource control (RRC) connection request message received on the at least one cell from a terminal;
transmitting, to the DU of the gNB, a first RRC transfer message including an RRC connection setup message for the terminal;
receiving, from the DU of the gNB, a second RRC transfer message including an RRC connection complete message for the terminal; and
transmitting, to an access and mobility management function (AMF), an initial terminal message.

7. The method of claim 6, wherein the initial transfer message further includes a cell-radio network temporary identifier (C-RNTI) allocated by the DU.

8. A method performed by a distributed unit (DU) of a gNodeB (gNB) including a central unit (CU) and at least one DU, the method comprising:
transmitting, to the CU of the gNB, a first message for setting up an F1 interface, the first message including an identity on the DU and serving cell information on the DU;
receiving, from the CU of the gNB, a second message as a response to the first message, the second message including information on at least one cell in the DU, the at least one cell in the DU being identified based on the serving cell information on the DU,
wherein the serving cell information includes a global cell identity, a physical cell identity, a public land mobile network (PLMN) identity, cell frequency information and cell bandwidth information, and
wherein the information on the at least one cell includes the global cell identity.

9. The method of claim 8, wherein the information on the at least one cell further includes at least one of the physical cell identity, master information, or a system information block for the at least one cell.

10. The method of claim 8, wherein the first message further includes capability information on the DU, and wherein the serving cell information further includes a tracking area code.

11. The method of claim 8, wherein the information on the at least one cell included in the second message indicates an establishment of the at least one cell in the DU.

12. The method of claim 8, wherein the at least one cell is to be activated based on the second message.

13. The method of claim 8, further comprising:
transmitting, to the CU of the gNB, an initial transfer message through the F1 interface, the initial transfer message including a radio resource control (RRC) connection request message received on the at least one cell from a terminal;
receiving, from the CU of the gNB, a first RRC transfer message including an RRC connection setup message for the terminal;
transmitting, to the terminal, the RRC connection setup message for the terminal;
receiving, from the terminal, an RRC connection setup complete message for the terminal; and
transmitting, to the CU of the gNB, a second RRC transfer message including the RRC connection complete message for the terminal.

14. The method of claim 13, further comprising:
wherein the initial transfer message further includes a cell-radio network temporary identifier (C-RNTI) allocated by the DU.

15. A central unit (CU) of a gNodeB (gNB) including the CU and at least one distributed unit (DU), the CU comprising:
a transceiver; and
a controller coupled with the transceiver and configured to:
receive, from a DU of the gNB, a first message for setting up an F1 interface, the first message including an identity on the DU and serving cell information on the DU,
store data included in the first message, and
transmit, to the DU of the gNB, a second message as a response to the first message, the second message including information on at least one cell in the DU, the at least one cell in the DU being identified based on the serving cell information on the DU,
wherein the serving cell information includes a global cell identity, a physical cell identity, a public land mobile network (PLMN) identity, cell frequency information and cell bandwidth information, and
wherein the information on the at least one cell includes the global cell identity.

16. The CU of claim 15, wherein the information on the at least one cell further includes at least one of the physical cell identity, master information, or a system information block for the at least one cell.

17. The CU of claim 15, wherein the first message further includes capability information on the DU, and
wherein the serving cell information further includes a tracking area code.

18. The CU of claim 15, wherein the information on the at least one cell included in the second message indicates an establishment of the at least one cell in the DU.

19. The CU of claim 15, wherein the at least one cell is to be activated based on the second message.

20. The CU of claim 15, wherein the controller is further configured to:
receive, from the DU of the gNB, an initial transfer message through the F1 interface, the initial transfer message including a radio resource control (RRC) connection request message received on the at least one cell from a terminal;
transmit, to the DU of the gNB, a first RRC transfer message including an RRC connection setup message for the terminal;
receive, from the DU of the gNB, a second RRC transfer message including an RRC connection complete message for the terminal; and
transmit, to an access and mobility management function (AMF), an initial terminal message.

21. The CU of claim 20, wherein the initial transfer message further includes a cell-radio network temporary identifier (C-RNTI) allocated by the DU.

22. A distributed unit (DU) of a gNodeB (gNB) including a central unit (CU) and at least one DU, the DU comprising:
a transceiver; and
a controller coupled with the transceiver and configured to:
transmit, to the CU of the gNB, a first message for setting up an F1 interface, the first message including an identity on the DU and serving cell information on the DU,
receive, from the CU of the gNB, a second message as a response to the first message, the second message including information on at least one cell in the DU, the at least one cell in the DU being identified based on the serving cell information on the DU,
wherein the serving cell information includes a global cell identity, a physical cell identity, a public land mobile network (PLMN) identity, cell frequency information and cell bandwidth information, and
wherein the information on the at least one cell includes the global cell identity.

23. The DU of claim 22, wherein the information on the at least one cell further includes at least one of the physical cell identity, master information, or a system information block for the at least one cell.

24. The DU of claim 22, wherein the first message further includes capability information on the DU, and
wherein the serving cell information further includes a tracking area code.

25. The DU of claim 22, wherein the information on the at least one cell included in the second message indicates an establishment of the at least one cell in the DU.

26. The DU of claim 22, wherein the at least one cell is to be activated based on the second message.

27. The DU of claim 22, wherein the controller is further configured to:
transmit, to the CU of the gNB, an initial transfer message through the F1 interface, the initial transfer message including a radio resource control (RRC) connection request message received on the at least one cell from a terminal,
receive, from the CU of the gNB, a first RRC transfer message including an RRC connection setup message for the terminal,
transmit, to the terminal, the RRC connection setup message for the terminal,
receive, from the terminal, an RRC connection setup complete message for the terminal, and
transmit, to the CU of the gNB, a second RRC transfer message including the RRC connection complete message for the terminal.

28. The DU of claim 27, wherein the initial transfer message further includes a cell-radio network temporary identifier (C-RNTI) allocated by the DU.

\* \* \* \* \*